United States Patent
Sasai et al.

(10) Patent No.: US 8,953,897 B2
(45) Date of Patent: *Feb. 10, 2015

(54) CODING ARTIFACTS REMOVING METHOD, CODING METHOD, DECODING METHOD, CODING ARTIFACTS REMOVING APPARATUS, CODING APPARATUS, AND DECODING APPARATUS

(71) Applicant: Panasonic Intellectual Property Corporation of America, Torrance, CA (US)

(72) Inventors: Hisao Sasai, Osaka (JP); Matthias Narroschke, Schaafheim (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/051,982

(22) Filed: Oct. 11, 2013

(65) Prior Publication Data

US 2014/0037221 A1  Feb. 6, 2014

Related U.S. Application Data

(62) Division of application No. 13/266,647, filed as application No. PCT/JP2011/002125 on Apr. 11, 2011.

(30) Foreign Application Priority Data

Apr. 13, 2010 (JP) ................... 2010-092682

(51) Int. Cl.
*G06K 9/36* (2006.01)
*G06T 5/00* (2006.01)
*H04N 19/86* (2014.01)

(52) U.S. Cl.
CPC ............... *G06T 5/001* (2013.01); *H04N 19/86* (2013.01)
USPC ............................................ 382/232

(58) Field of Classification Search
None
See application file for complete search history.

(56) References Cited

U.S. PATENT DOCUMENTS 5,937,101 A   8/1999   Jeon et al.
5,949,917 A   9/1999   Kawasaka
(Continued)

FOREIGN PATENT DOCUMENTS

CN   101076124 A   11/2007
JP   7-38762       2/1995
(Continued)

OTHER PUBLICATIONS

International Search Report issued Jul. 12, 2011 in International Application No. PCT/JP2011/002125.
(Continued)

*Primary Examiner* — Nirav G Patel
(74) *Attorney, Agent, or Firm* — Wenderoth, Lind & Ponack, L.L.P.

(57) ABSTRACT

A method of removing coding artifacts in first and second processed edges that are processed edges in an image signal and in different directions includes: determining, based on at least pixel values of first adjacent pixels adjacent to the first processed edge, a first target pixel from which coding artifacts are to be removed for the first processed edge (S11); removing coding artifacts from the determined first target pixel (S13); determining, based on at least pixel values of second adjacent pixels adjacent to the second processed edge, a second target pixel from which coding artifacts are to be removed for the second processed edge (S12); and removing coding artifacts from the determined second target pixel (S14), wherein at S12, the second target pixel is determined based on pixel values of the second adjacent pixels from which the coding artifacts are not removed at S13.

4 Claims, 40 Drawing Sheets

(56) References Cited

U.S. PATENT DOCUMENTS

| | | | |
|---|---|---|---|
| 8,606,036 B2 * | 12/2013 | Sasai et al. | 382/266 |
| 2009/0009518 A1 | 1/2009 | Ohtani | |
| 2009/0148062 A1 | 6/2009 | Gabso et al. | |
| 2011/0188766 A1 | 8/2011 | Nassor et al. | |

FOREIGN PATENT DOCUMENTS

| | | |
|---|---|---|
| JP | 8-251422 | 9/1996 |
| JP | 8-251591 | 9/1996 |
| JP | 2004-159147 | 6/2004 |
| JP | 2007-235886 | 9/2007 |
| JP | 2007-251881 | 9/2007 |

OTHER PUBLICATIONS

ISO/IEC 14496-10, Part 10, Advanced Video Coding, 2004.

Advanced video coding for generic audiovisual services, Series H: Audiovisual and Multimedia Systems, Infrastructure of audiovisual services—Coding of moving video, ITU-T, H.264, 2010 (corresponding to NPL-1 in the specification; ISO/IEC 14496-10, "MPEG-4 Part 10 Advanced Video Coding").

Office Action issued Nov. 4, 2014 in corresponding Chinese Application No. 201180018536.0 (with partial English translation).

* cited by examiner

FIG. 5
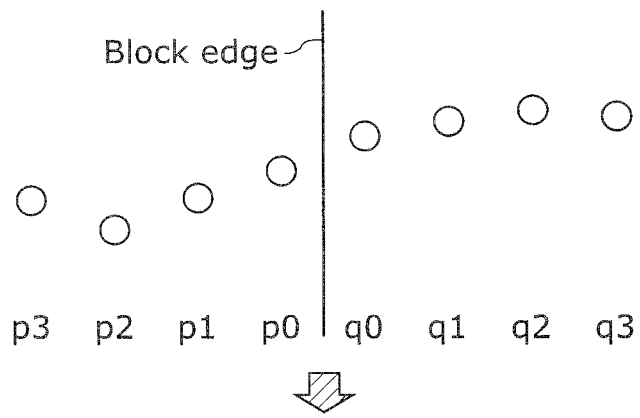
(a)
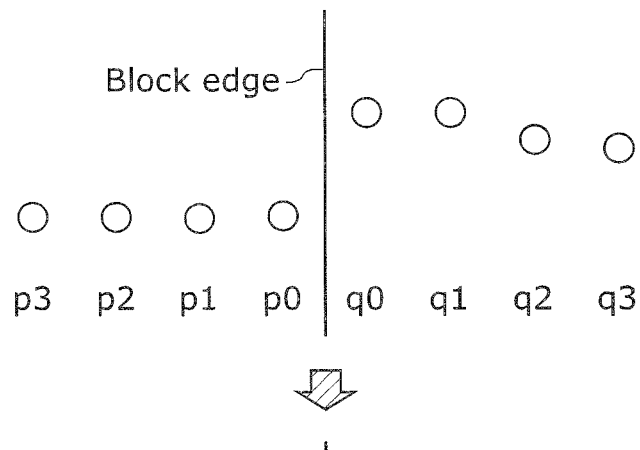
(b)
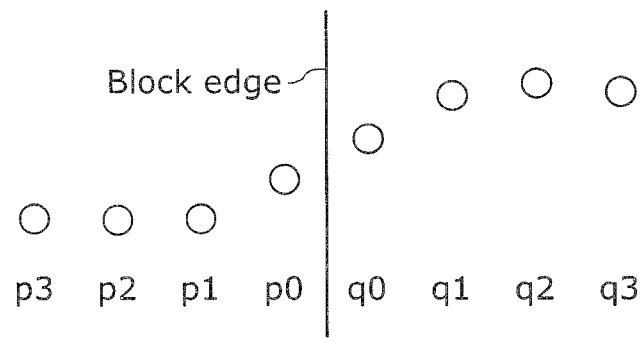
(c)

| | | | | | | | | |
|---|---|---|---|---|---|---|---|---|
| | $p3_0$ | $p2_0$ | $p1_0$ | $p0_0$ | $q0_0$ | $q1_0$ | $q2_0$ | $q3_0$ |
| | $p3_1$ | $p2_1$ | $p1_1$ | $p0_1$ | $q0_1$ | $q1_1$ | $q2_1$ | $q3_1$ |
| | $p3_2$ | $p2_2$ | $p1_2$ | $p0_2$ | $q0_2$ | $q1_2$ | $q2_2$ | $q3_2$ |
| A | $p3_3$ | $p2_3$ | $p1_3$ | $p0_3$ | $q0_3$ | $q1_3$ | $q2_3$ | $q3_3$ | B
| | $p3_4$ | $p2_4$ | $p1_4$ | $p0_4$ | $q0_4$ | $q1_4$ | $q2_4$ | $q3_4$ |
| | $p3_5$ | $p2_{05}$ | $p1_5$ | $p0_5$ | $q0_5$ | $q1_5$ | $q2_5$ | $q3_5$ |
| | $p3_6$ | $p2_6$ | $p1_6$ | $p0_6$ | $q0_6$ | $q1_6$ | $q2_6$ | $q3_6$ |
| | $p3_7$ | $p2_7$ | $p1_7$ | $p0_7$ | $q0_7$ | $q1_7$ | $q2_7$ | $q3_7$ |

FIG. 11A $$\left.\begin{array}{l}\left.\begin{array}{l}p2_2 + p0_2 \\ -2 \cdot p1_2\end{array}\right\} + \text{abs} \\ \left.\begin{array}{l}q2_2 + q0_2 \\ -2 \cdot q1_2\end{array}\right\} + \text{abs}\end{array}\right\} +$$

$$\underbrace{\hspace{4cm}}_{\text{4 sequential operations}}$$

FIG. 11B $$\left.\begin{array}{l}d < (\beta >> 2) \\ \left.\begin{array}{l}|p0_i + q0_i| \\ ((5 \cdot t_c + 1) >> 1)\end{array}\right\} < \\ \left.\begin{array}{l}(\beta >> 2) \\ \left.\begin{array}{l}|p3_i + p0_i| \\ |q3_i + q0_i|\end{array}\right\}+\end{array}\right\} < \end{array}\right\} \text{and}$$

$$\underbrace{\hspace{5cm}}_{\text{6 sequential operations}}$$

FIG. 11C $$\underbrace{\left.\begin{array}{l}13 \cdot (q0_i + p0_i) \\ 4 \cdot (q1_i + p1_i) \\ -5 \cdot (q2_i + p2_i) \\ \Delta/2\end{array}\right\} \begin{array}{l}+ \\ +16\end{array} \right\} + >> 5 \quad \begin{array}{l}\text{Clip} \\ (2\text{"if"})\end{array} \right\} + \begin{array}{l}\text{Clip} \\ (2\text{"if"})\end{array}}_{\text{10 sequential operations}}$$

FIG. 13
(a)
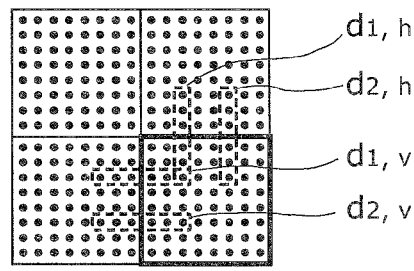
- $d_{1,h}$
- $d_{2,h}$
- $d_{1,v}$
- $d_{2,v}$
(b)
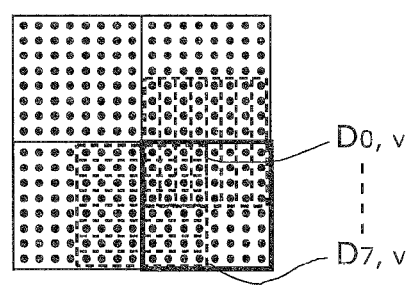
- $D_{0,v}$
- $D_{7,v}$
(c)
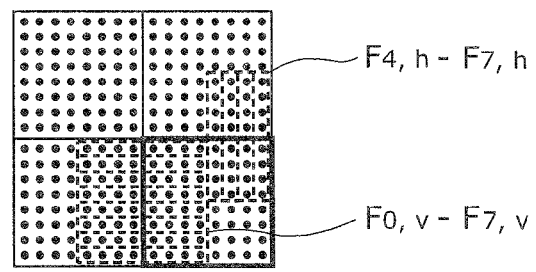
- $F_{4,h} - F_{7,h}$
- $F_{0,v} - F_{7,v}$
(d)
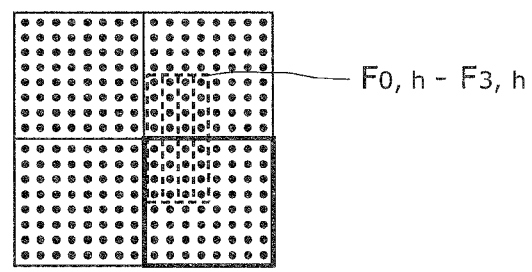
- $F_{0,h} - F_{3,h}$ FIG. 26
(a)
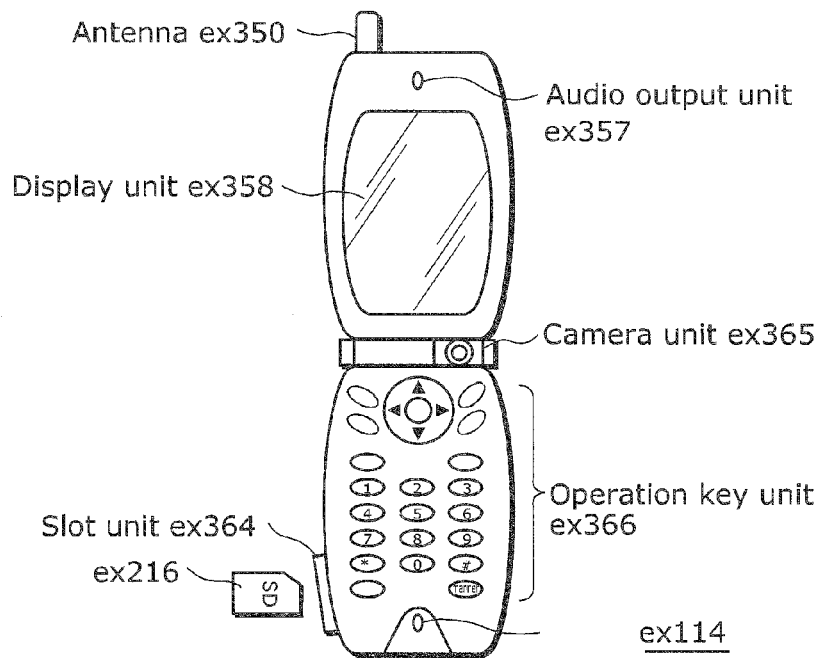
(b)
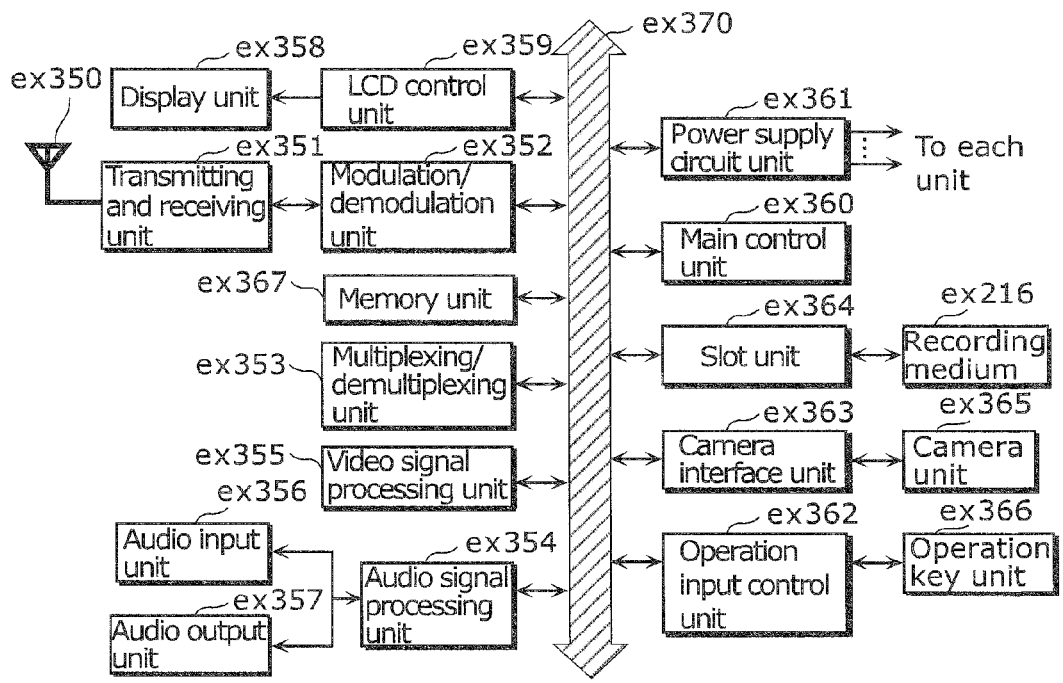

FIG. 27

| Video stream (PID=0x1011 Primary video) |
|---|
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00 Secondary video) |
| Video stream (PID=0x1B01 Secondary video) |

FIG. 30
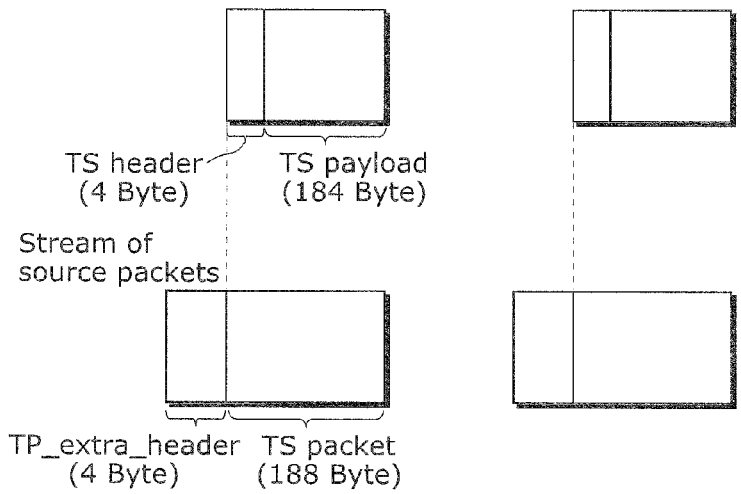
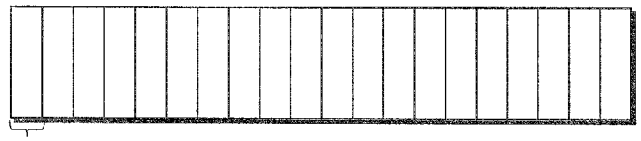
FIG. 31
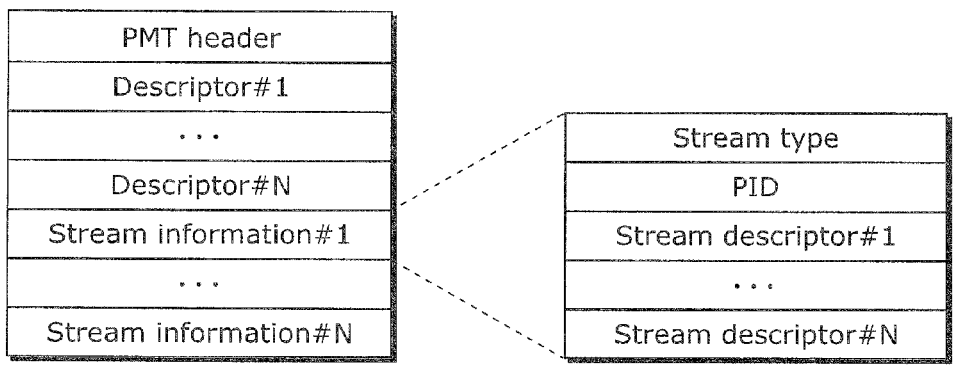

FIG. 38
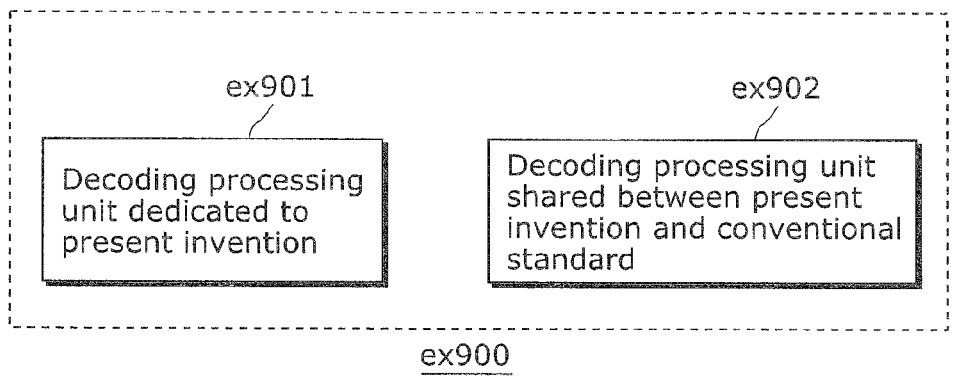
FIG. 39A
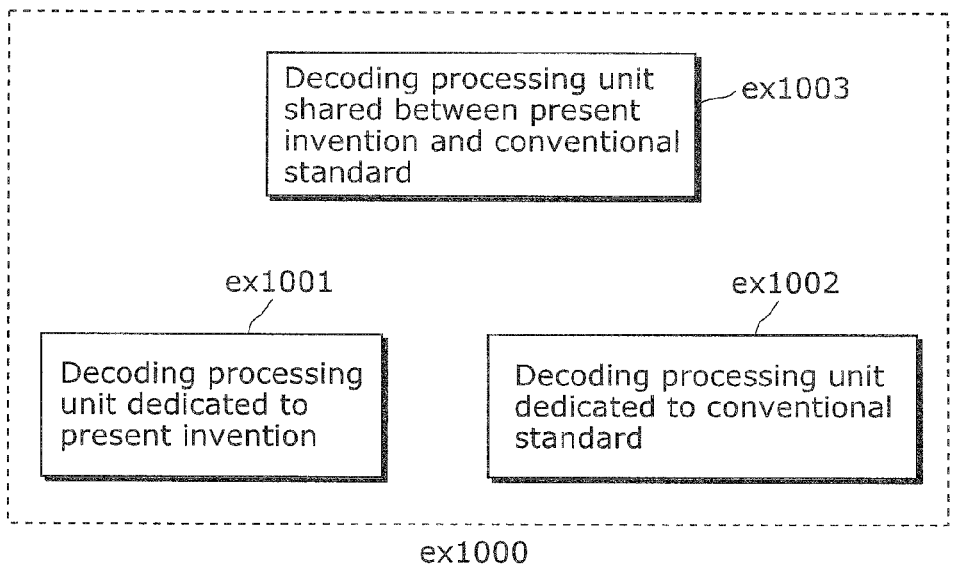
FIG. 39B

CODING ARTIFACTS REMOVING METHOD, CODING METHOD, DECODING METHOD, CODING ARTIFACTS REMOVING APPARATUS, CODING APPARATUS, AND DECODING APPARATUS

TECHNICAL FIELD

The present invention relates to a method of removing coding artifacts occurring in a processed edge when an image signal is coded, and a coding method and a decoding method that use the coding artifacts removing method, thus further increasing a compression ratio.

BACKGROUND ART

In the conventional image coding standards represented by the ITU-T standards denoted as H.26x and the ISO/IEC standards denoted as MPEG-X, a screen is divided per predetermined unit, and coding is performed on a per divided unit basis. For example, in H.264/MPEG-4 advanced video coding (AVC) (for example, see NPL 1), a screen (picture) is processed per horizontal 16 pixels×vertical 16 pixels included in a macroblock.

When motion compensation is performed, the macroblock is divided into blocks (horizontal 4 pixels×vertical 4 pixels at minimum). Information can be compressed by (i) performing the motion compensation using a different motion vector for each block, (ii) performing frequency conversion on difference signals with an original signal, (iii) accumulating the difference signals in a low frequency domain, and (iv) quantizing the difference signals. It is known, in the coding method per block using orthogonal transformation, such as DCT transform, that grating distortion called blocking artifacts occur in a block edge. Here, in the orthogonal transformation, the difference signals are accumulated in the low frequency domain.

FIG. 40 illustrates a block diagram of a coding artifacts removing unit using a conventional coding artifacts removing method. A switch 1001 switches between a horizontal block edge (hereinafter referred to as horizontal edge) and a vertical block edge (hereinafter referred to as vertical edge) to perform processing on the selected block edge. A filtering target pixel determining unit 1002 determines a pixel (hereinafter referred to as "filtering target pixel" or "target pixel" as necessary) from which coding artifacts are to be removed (hereinafter referred to as "filtering" as necessary), based on pixel values of pixels adjacent to a block edge. Then, a filtering unit 1003 removes coding artifacts from the filtering target pixel. A switch 1004 is set so that an image signal from which the coding artifacts have been removed is again transmitted to the switch 1001 when the horizontal edge or the vertical edge has yet to be processed. The filtering target pixel determining unit 1002 determines a filtering target pixel for a block edge in an unprocessed direction. As such, the coding artifacts are sequentially removed from horizontal edges and vertical edges.

BACKGROUND ART

Non Patent Literature

[NPL 1] ISO/IEC 14496-10, "MPEG-4 Part 10 Advanced Video Coding"

SUMMARY OF INVENTION

Technical Problem

Since the horizontal edges and the vertical edges are sequentially processed in the conventional standard, a target pixel from which coding artifacts are to be removed is determined using an image signal in which coding artifacts have been removed from the horizontal edge or the vertical edge. Thus, judgment about whether change in a pixel value of a pixel in a block edge is caused by change in blocking artifacts or change in an object edge is wrongly made, and thus there is a problem that coding artifacts are removed from a pixel in the object edge.

FIG. 41 illustrates a problem in the conventional coding artifacts removing process. In FIG. 41, the diagonally shaded area indicates an area of an object. The solid area indicates the background.

As illustrated in (a) of FIG. 41, first, a horizontal edge is filtered. As a result, pixel values in a cross-hatching area of (b) of FIG. 41 are changed according to the filtering. Next, when a vertical edge is filtered, non-filtered pixels are determined based on the pixel values for which the horizontal edge has been filtered (in the cross-hatching area). As a result, filtering (smoothing) is wrongly performed at a position of an object edge (1101). In other words, the object edge is blurred by the filtering, thus leading to the decreased coding efficiency.

The present invention has been conceived to solve the problems, and has an object of providing a coding artifacts removing method and others in which the probability of degrading the image quality of an image signal will be lower.

Solution to Problem

In order to achieve the object, a coding artifacts removing method according to an aspect of the present invention is a coding artifacts removing method of removing coding artifacts in a first processed edge and a second processed edge that are processed edges in an image signal and are in different directions, and includes: determining, based on at least pixel values of first adjacent pixels, a first target pixel from which coding artifacts are to be removed for the first processed edge, the first adjacent pixels being adjacent to the first processed edge; removing coding artifacts from the determined first target pixel; determining, based on at least pixel values of second adjacent pixels, a second target pixel from which coding artifacts are to be removed for the second processed edge, the second adjacent pixels being adjacent to the second processed edge; and removing coding artifacts from the determined second target pixel, wherein in the determining of a second target pixel, the second target pixel is determined based on pixel values of the second adjacent pixels from which the coding artifacts are not removed in the removing from the determined first target pixel.

Accordingly, target pixels from which coding artifacts are to be removed can be determined for the first processed edge and the second processed edge, based on pixel values of pixels from which coding artifacts are not removed. Thus, it is possible to solve a conventional problem of determining even a pixel corresponding to an object edge as a target pixel when a target pixel is determined based on pixel values of pixels from which coding artifacts have been removed. In other words, it is possible to implement the coding artifacts removing process in which the probability of degrading the image quality of an image signal will be lower.

Furthermore, a decoding method according to an aspect of the present invention is a method of decoding an image from a bit stream, and includes: decoding an image signal from the bit stream; and removing coding artifacts from the image signal decoded in the decoding, using the coding artifacts removing method.

Furthermore, a coding method according to an aspect of the present invention is a method of coding an image, and includes: coding the image; reconstructing an image signal from the image coded in the coding; and removing coding artifacts from the image signal reconstructed in the reconstructing, using the coding artifacts removing method, wherein in the coding, the image is coded with reference to the image signal from which the coding artifacts are removed in the removing.

Furthermore, a coding artifacts removing apparatus according to an aspect of the present invention is a coding artifacts removing apparatus that removes coding artifacts in a first processed edge and a second processed edge that are processed edges in an image signal and are in different directions, and includes: a first determining unit configured to determine, based on at least pixel values of first adjacent pixels, a first target pixel from which coding artifacts are to be removed for the first processed edge, the first adjacent pixels being adjacent to the first processed edge; a first removing unit configured to remove coding artifacts from the determined first target pixel; a second determining unit configured to determine, based on at least pixel values of second adjacent pixels, a second target pixel from which coding artifacts are to be removed for the second processed edge, the second adjacent pixels being adjacent to the second processed edge; and a second removing unit configured to remove coding artifacts from the determined second target pixel, wherein the second determining unit is configured to determine the second target pixel based on pixel values of the second adjacent pixels from which the first removing unit does not remove the coding artifacts.

Furthermore, a decoding apparatus according to an aspect of the present invention is a decoding apparatus that decodes an image from a bit stream, and includes: a decoding unit configured to decode an image signal from the bit stream; and the coding artifacts removing apparatus, wherein the coding artifacts removing apparatus removes coding artifacts from the image signal decoded by the decoding unit.

Furthermore, a coding apparatus according to an aspect of the present invention is a coding apparatus that codes an image, and includes: a coding unit configured to code the image; a reconstructing unit configured to reconstruct an image signal from the image coded by the coding unit; and the coding artifacts removing apparatus, wherein the coding artifacts removing apparatus removes coding artifacts from the image signal reconstructed by the reconstructing unit, and the coding unit is configured to code the image with reference to the image signal from which the coding artifacts removing apparatus removes the coding artifacts.

Advantageous Effects of Invention

According to the present invention, a coding artifacts removing process in which the probability of degrading the image quality of an image signal will be lower can be implemented by determining target pixels from which coding artifacts are to be removed for the first processed edge and the second processed edge, based on pixel values of pixels from which coding artifacts are not removed. Furthermore, since pixel values of pixels from which coding artifacts have been removed are not used for determining a target pixel from which coding artifacts are to be removed, the target pixel can be determined at the same time when coding artifacts are removed (parallel processing). Accordingly, since an object edge included in an original image can be maintained, the present invention is highly suitable for practical use.

BRIEF DESCRIPTION OF DRAWINGS

FIG. 5 conceptually illustrates filtering according to Embodiment 1.

FIG. 11A illustrates the number of sequential operations in a determining process.

FIG. 11B illustrates the number of sequential operations in a determining process.

FIG. 11C illustrates the number of sequential operations in a filtering process.

FIG. 13 illustrates 4 sequential steps in a coding artifacts removing method according to Embodiment 3.

FIG. 26 (a) illustrates an example of a cellular phone, and FIG. 26 (b) illustrates an example of a configuration of the cellular phone.

FIG. 27 illustrates a structure of multiplexed data.

FIG. 30 illustrates a structure of TS packets and source packets in multiplexed data.

FIG. 31 illustrates a data structure of a Program Map Table (PMT).

FIG. 38 illustrates an example of a look-up table in which the standards of video data are associated with driving frequencies.

FIG. 39A illustrates an example of a configuration for sharing a module of a signal processing unit, and FIG. 39B illustrates another example of a configuration for sharing a module of a signal processing unit.

DESCRIPTION OF EMBODIMENTS

Embodiments according to the present invention will be described with reference to drawings.

Embodiment 1

Embodiment 1 according to the present invention describes a method of removing coding artifacts in an image signal on a per block basis as a processing unit. The block is at least one group of pixels included in an image. In Embodiment 1, the block is rectangular, a first processed edge is a horizontal edge of the block, and a second processed edge is a vertical edge of the block.

More specifically, the vertical edge is an edge between a block that is currently being processed (hereinafter referred to as "currently processed block" or "current block") and a block that is previously processed and adjacent to the left of the current block (hereinafter referred to as "processed block" or "previous block"). Furthermore, the horizontal edge is an edge between the current block and the previous block adjacent to the upper of the current block.

Figure 1:
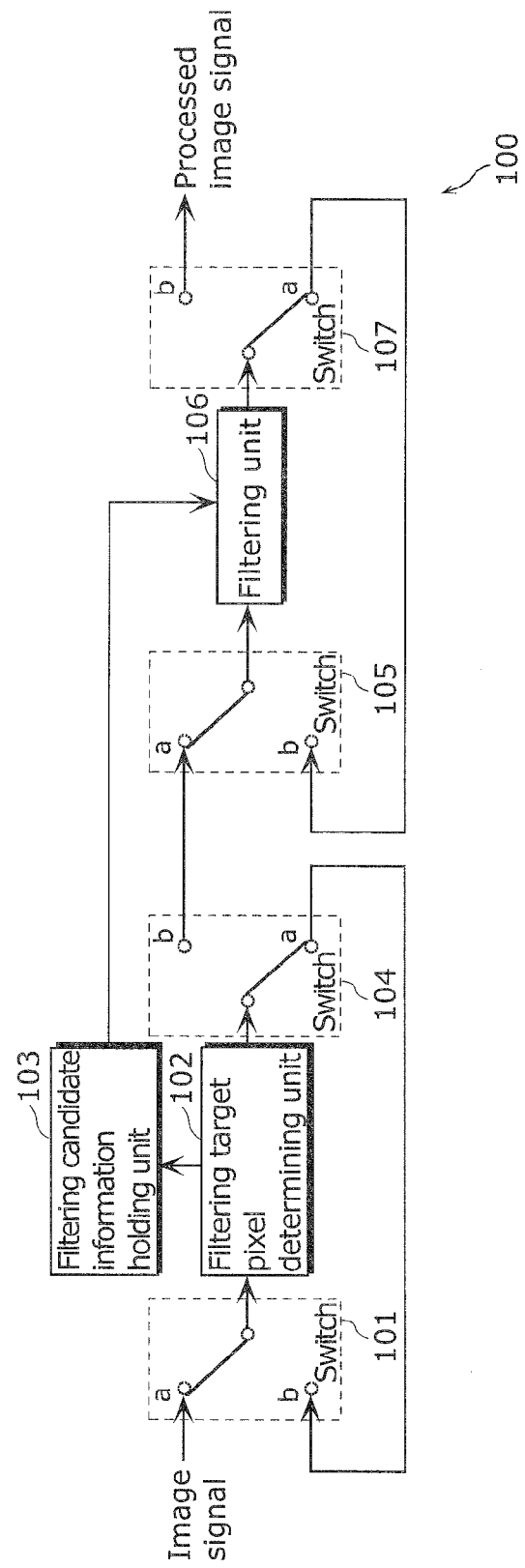
FIG. 1 is a block diagram illustrating a functional configuration of a coding artifacts removing apparatus 100 according to Embodiment 1 in the present invention.

FIG. 1 is a block diagram illustrating a functional configuration of a coding artifacts removing apparatus 100 according to Embodiment 1. As illustrated in FIG. 1, the coding artifacts removing apparatus 100 includes a filtering target pixel determining unit 102, a filtering candidate information holding unit 103, switches 101, 104, 105, and 107, and a filtering unit 106. An input signal to be transmitted to the coding artifacts removing apparatus 100 is an image signal that possibly includes coding artifacts.

The switch 101 switches between destinations of the input signal to be transmitted to the filtering target pixel determining unit 102. Along with the switching of the destinations, the switch 101 switches between directions of a block edge to be processed by the filtering target pixel determining unit 102.

In Embodiment 1, when the switch 101 is connected to "a", an image signal is transmitted from outside of the coding artifacts removing apparatus 100 to the filtering target pixel determining unit 102. When the switch 101 is connected to "b", an image signal is transmitted from the filtering target pixel determining unit 102 again to the filtering target pixel determining unit 102.

The filtering target pixel determining unit 102 corresponds to a first determining unit and a second determining unit. The filtering target pixel determining unit 102 determines a filtering target pixel for a block edge, with reference to at least pixel values of adjacent pixels.

Here, the adjacent pixels are two pixels adjacent to a block edge. Furthermore, the filtering target pixels are pixels to be filtered by the filtering unit 106. Furthermore, the filtering is an example of a coding artifacts removing process, for example, a process using an adaptive deblocking filter.

More specifically, the filtering target pixel determining unit 102 determines a filtering target pixel (first target pixel) for a vertical edge, based on pixel values of adjacent pixels (first adjacent pixels) adjacent to the vertical edge. Next, the filtering target pixel determining unit 102 determines a filtering target pixel (second target pixel) for a horizontal edge, based on pixel values of adjacent pixels (second adjacent pixels) adjacent to the horizontal edge. Here, the filtering target pixel determining unit 102 determines a filtering target pixel for the horizontal edge, with reference to pixel values of non-filtered pixels, as the pixel values of pixels adjacent to the horizontal edge.

More specifically, when the switch 101 is connected to "a", the filtering target pixel determining unit 102 determines a filtering target pixel for the vertical edge, according to Embodiment 1. On the other hand, when the switch 101 is connected to "b", the filtering target pixel determining unit 102 determines a filtering target pixel for the horizontal edge.

The filtering candidate information holding unit 103 holds, as filtering candidate information, information on the filtering target pixel determined by the filtering target pixel determining unit 102. More specifically, the filtering candidate information holding unit 103 holds information indicating a position of the filtering target pixel, for example, for each block edge as the filtering candidate information. Furthermore, the filtering candidate information holding unit 103 may hold, for example, information indicating whether or not one of adjacent pixels of a block edge is a filtering target pixel, as the filtering candidate information.

The switch 104 switches between destinations of an output signal from the filtering target pixel determining unit 102. According to Embodiment 1, when the switch 104 is connected to "a", the output signal from the filtering target pixel determining unit 102 is output to the switch 101. On the other hand, when the switch 104 is connected to "b", the output signal from the filtering target pixel determining unit 102 is output to the switch 105.

The switch 105 switches between destinations of the input signal to be transmitted to the filtering unit 106. Along with the switching of the destinations, the switch 105 switches between directions of a block edge to be processed by the filtering unit 106.

The filtering unit 106 corresponds to a first removing unit and a second removing unit. The filtering unit 106 filters the determined filtering target pixel. More specifically, when the switch 105 is connected to "a", the filtering unit 106 filters the filtering target pixel for a vertical edge. On the other hand, when the switch 105 is connected to "b", the filtering unit 106 filters the filtering target pixel for a horizontal edge.

The switch 107 switches between destinations of an output signal from the filtering unit 106. The output signal is a filtered image signal. According to Embodiment 1, when the switch 107 is connected to "a", the output signal from the filtering unit 106 is output to the switch 105. On the other hand, when the switch 107 is connected to "b", the output signal from the filtering unit 106 is output outside of the coding artifacts removing apparatus 100, as a processed image signal.

Next, each operation of the coding artifacts removing apparatus 100 with such a configuration will be described.

Figure 2:
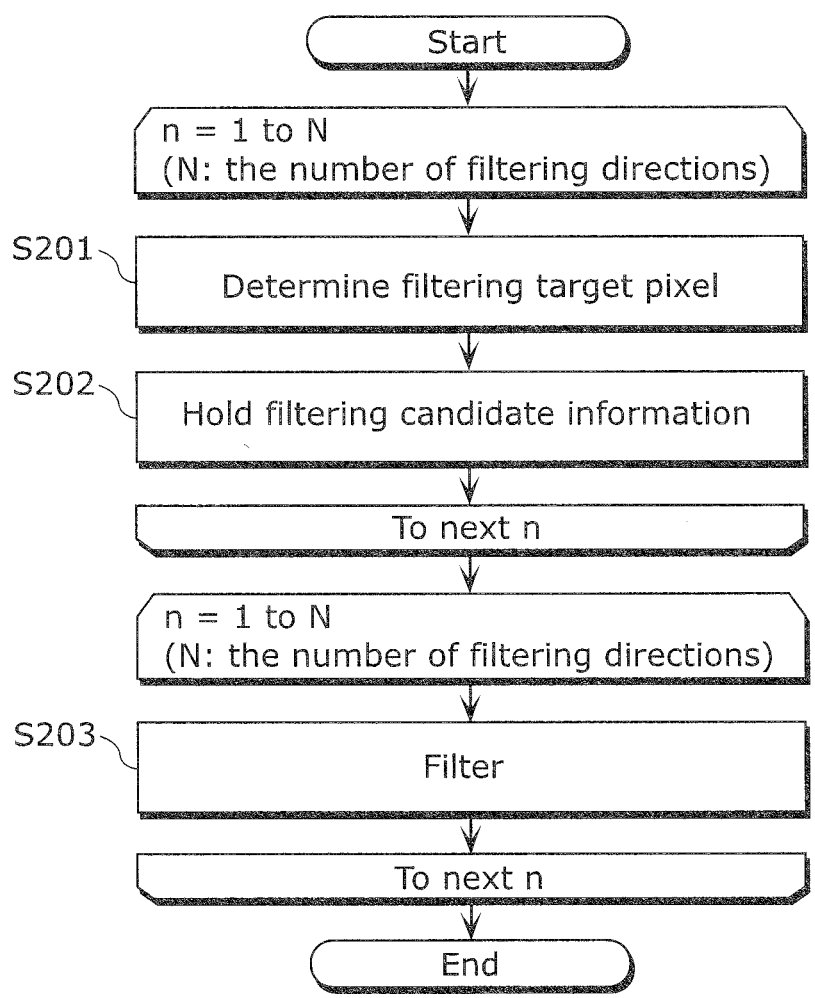
FIG. 2 is a flowchart indicating an example of a coding artifacts removing method according to Embodiment 1.

FIG. 2 is a flowchart indicating an example of a coding artifacts removing method according to Embodiment 1. More specifically, FIG. 2 is a flowchart indicating processing procedure on one block by the coding artifacts removing apparatus 100 according to Embodiment 1.

First, the filtering target pixel determining unit 102 determines a filtering target pixel for a block edge corresponding to an N-th filtering direction, with reference to at least pixel values of adjacent pixels of the block edge (S201). The process at S201 corresponds to the determining of a first target pixel and the determining of a second target pixel.

The detailed specific example of the process at S201 will be described hereinafter.

When the processing starts, the switch 101 is connected to "a". The filtering target pixel determining unit 102 receives an image signal transmitted to "a" of the switch 101. When the switch 101 is connected to "a", the filtering target pixel determining unit 102 determines a filtering target pixel for a vertical edge corresponding to a horizontal filtering direction (a first filtering direction).

Furthermore, after determining a filtering target pixel for a vertical edge, the switch 101 is connected to "b". The filtering target pixel determining unit 102 receives an image signal transmitted from "a" of the switch 104 to "b" of the switch 101. When the switch 101 is connected to "b", the filtering target pixel determining unit 102 determines a filtering target pixel for a horizontal edge corresponding to a vertical filtering direction (a second filtering direction).

Here, an example of a method of determining a filtering target pixel by the filtering target pixel determining unit 102 will be described with reference to FIGS. 3A to 3C.

Figure 3A:
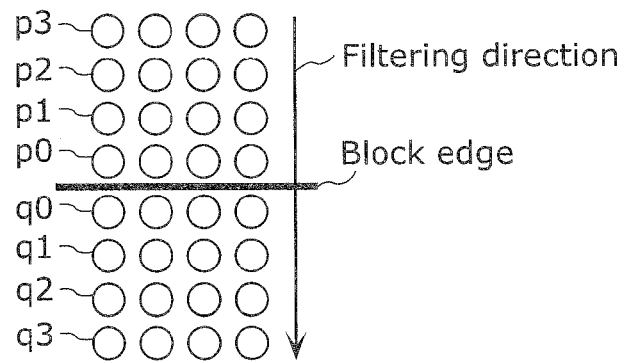
FIG. 3A schematically illustrates an example of a method of determining a filtering target pixel.
Figure 3B:
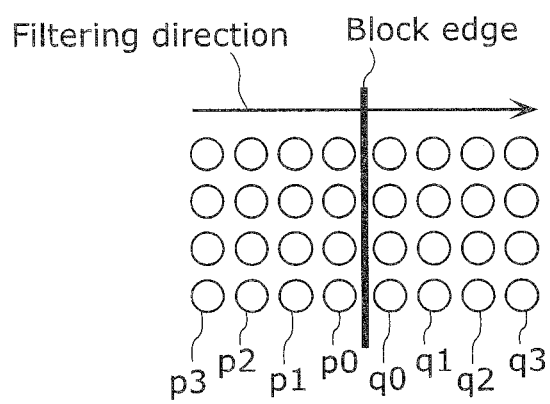
FIG. 3B schematically illustrates an example of a method of determining a filtering target pixel.

As illustrated in FIGS. 3A and 3B, indices of pixels adjacent to a horizontal edge and indices of pixels adjacent to a vertical edge are denoted as p0 to p3 and q0 to q3. The pixel values are denoted by these indices. In the following description, for example, a pixel with the index of p0 is denoted as "pixel p0".

Here, a filtering target pixel is determined per processing line that extends in a filtering direction. In other words, a filtering target pixel is determined for each processing line that is a row of pixels in a direction orthogonal to a block edge. FIG. 3C schematically illustrates the processing line for determining a filtering target pixel.

Figure 3C:
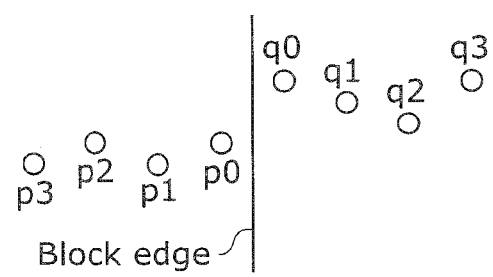
FIG. 3C schematically illustrates an example of a method of determining a filtering target pixel.

More specifically, FIG. 3C illustrates a processing line for determining a filtering target pixel for a vertical edge. For example, in FIG. 3A, the pixels p0 and q0 in a vertical line at the left end are determined as filtering target pixels, and the pixels p1, p0, q0, and q1 in a second line from the left end are also determined as filtering target pixels.

Figure 4:
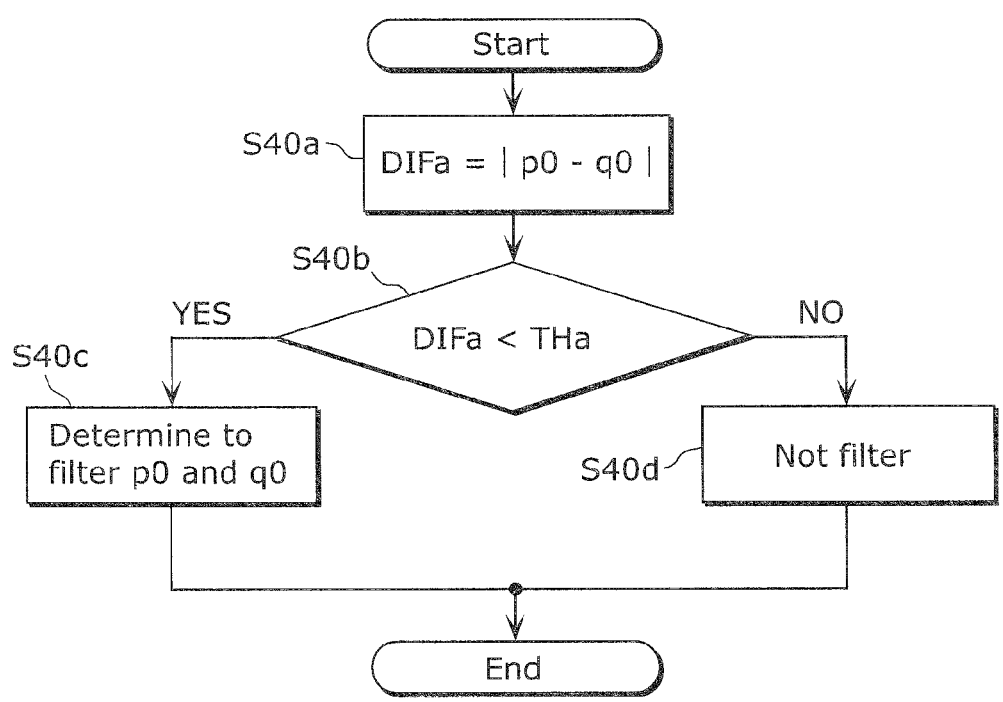
FIG. 4 is a flowchart indicating an example of a method of determining a filtering target pixel according to Embodiment 1.

FIG. 4 is a flowchart indicating an example of a method of determining a filtering target pixel according to Embodiment 1.

First, the filtering target pixel determining unit 102 calculates an absolute difference DIFa between the pixel p0 and the pixel q0 that are adjacent to a block edge (Step S40*a*). Next, the filtering target pixel determining unit 102 compares the calculated absolute difference DIFa with a threshold THa that is given in a predetermined method (Step S40*b*). The threshold THa may be, for example, a value determined according to a quantization step value to be used for coding or decoding.

Here, when the absolute difference DIFa is smaller than the threshold THa (Yes at Step S40*b*), the filtering target pixel determining unit 102 determines to filter the pixel p0 and the pixel q0 (Step S40*c*). In other words, the filtering target pixel determining unit 102 determines, as filtering target pixels, the pixel p0 and the pixel q0 that are adjacent to the block edge.

On the other hand, when the absolute difference DIFa is equal to or larger than the threshold THa (No at Step S40*b*), the filtering target pixel determining unit 102 determines not to filter the pixel p0 and the pixel q0 (Step S40*d*). In other words, the filtering target pixel determining unit 102 determines, as non-filtered target pixels, the pixel p0 and the pixel q0 that are adjacent to the block edge.

As such, the filtering target pixel determining unit 102 determines filtering target pixels for a block edge, based on pixel values of adjacent pixels of a block edge at Step S201. The filtering target pixels have only to be determined based a relationship (for example, a difference value or a ratio) between pixel values of adjacent pixels of a block edge. Other examples of determining a filtering target pixel will be described in other Embodiments.

According to Embodiment 1, the horizontal and vertical directions are exemplified as, but not limited to, filtering directions. When a block edge is in a diagonal direction, horizontal or vertical directions with respect to the diagonal direction may probably be determined as the filtering directions. Furthermore, the filtering directions do not necessarily have to be two directions but may be three or more directions according to the shape of blocks.

Next, the filtering target pixel determining unit 102 outputs information on filtering target pixels as filtering candidate information to the filtering candidate information holding unit 103, and outputs the image signal as it is to the switch 104 (Step S202). In other words, the filtering candidate information holding unit 103 holds, as the filtering candidate information, information on the filtering target pixels for the vertical edge or the horizontal edge that are determined by the filtering target pixel determining unit 102.

When the processing starts, the switch 104 is connected to "a". Thus, "a" of the switch 104 transmits the image signal output from the filtering target pixel determining unit 102, to "b" of the switch 101. Here, the switch 101 is switched from "a" to "b". In other words, the filtering target pixel determining unit 102 again receives the image signal output from the filtering target pixel determining unit 102 without any change.

Here, the filtering target pixel determining unit 102 determines filtering target pixels for a horizontal edge as described above. The filtering target pixel determining unit 102 outputs information on the filtering target pixels for the horizontal edge to the filtering candidate information holding unit 103.

After processing at Steps S201 and S202 on the N-th filtering direction, the switch 104 is connected to "b". Thus, the switch 105 receives the image signal output from the filtering target pixel determining unit 102. When the processing starts, the switch 105 is connected to "a".

Next, the filtering unit 106 filters the received image signal based on the filtering candidate information obtained from the filtering candidate information holding unit 103 (Step S203). In other words, the filtering unit 106 filters the filtering target pixels determined by the filtering target pixel determining unit 102. This Step S203 corresponds to the removing from the determined first target pixel and the removing from the determined second target pixel.

The specific example of the process at S203 will be described hereinafter.

When the switch 105 is connected to "a", the filtering unit 106 filters a vertical edge. On the other hand, when the switch 105 is connected to "b", the filtering unit 106 filters a horizontal edge.

FIG. 5 conceptually illustrates filtering according to Embodiment 1. In FIG. 5, the horizontal axis represents pixel positions, and the vertical axis represents pixel values.

For example, when an image signal of an original image in (a) of FIG. 5 is coded per block, blocking artifacts occur as illustrated in (b) of FIG. 5. The blocking artifacts are sequential and smooth change in pixel values in a block, and non-sequential change in pixel values only in a block edge.

Thus, with the filtering on the block edge in (b) of FIG. 5, the pixel values in the block edge are corrected so as to be sequentially changed as illustrated in (c) of FIG. 5, and thus the blocking artifacts caused by the coding are reduced.

As such, the filtering unit 106 filters the filtering target pixels determined by the filtering target pixel determining unit 102. The detailed filtering method will be described in other Embodiments.

Here, the switching operations of the switch 107 will be described. The filtered image signal is output to the switch 107. When the processing starts, the switch 107 is connected to "a". Thus, "a" of the switch 107 transmits the image signal output from the filtering unit 106 to "b" of the switch 105. Here, the switch 105 is switched from "a" to "b". In other words, the filtering unit 106 again receives the image signal output from the filtering unit 106 and filtered for the vertical edge.

Here, the filtering unit 106 filters a horizontal edge based on the filtering candidate information obtained from the filtering candidate information holding unit 103. The filtered image signal is output to the switch 107. Here, the switch 107 is switched from "a" to "b". Thus, the switch 107 outputs the image signal filtered for the horizontal edge, outside of the coding artifacts removing apparatus 100.

As described above, the coding artifacts removing apparatus 100 first determines filtering target pixels for both of a vertical edge and a horizontal edge, and then filters the vertical edge and the horizontal edge. In other words, the coding artifacts removing apparatus 100 determines the filtering target pixels based on pixel values of non-filtered pixels.

Modification of Embodiment 1

Although a filtering target pixel is determined in order of the filtering target pixels for the vertical edge and the filtering target pixels for the horizontal edge according to Embodiment 1, the filtering target pixels for both of the vertical edge and the horizontal edge may be determined in parallel.

Figure 6:
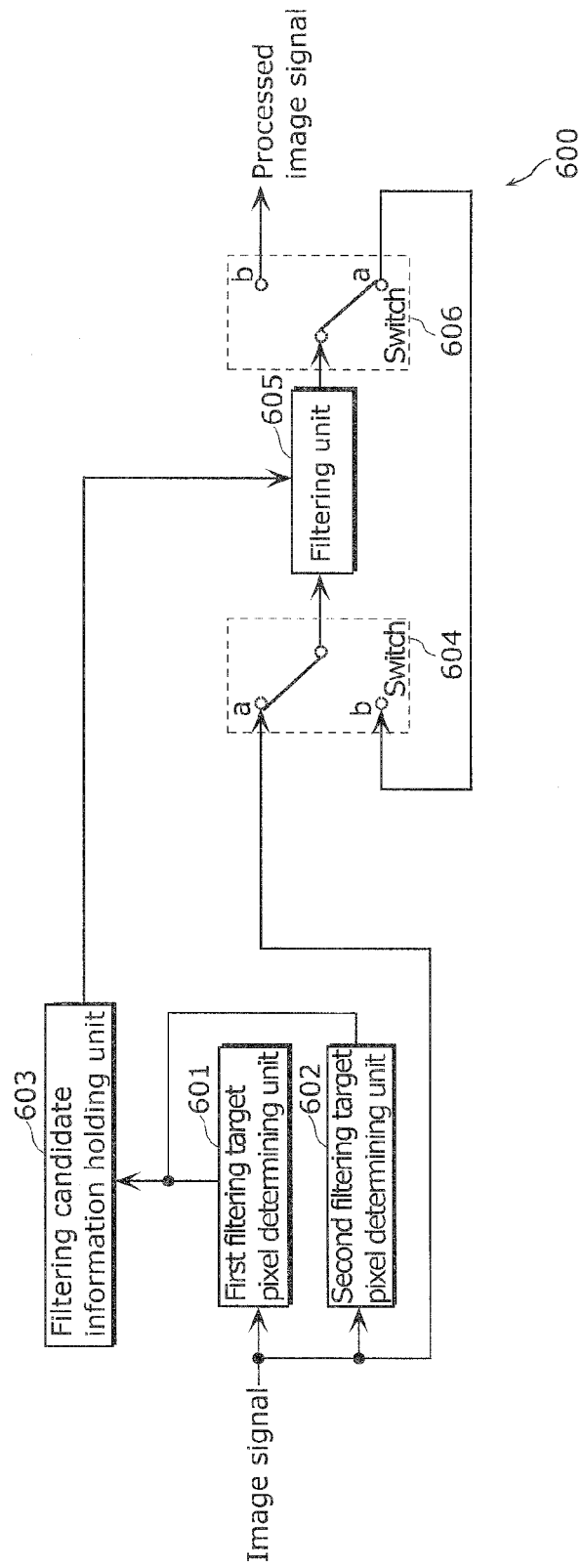
FIG. 6 is a block diagram illustrating an example of a functional configuration of a coding artifacts removing apparatus according to a modification of Embodiment 1 in the present invention.

FIG. 6 is a block diagram illustrating a functional configuration of a coding artifacts removing apparatus 600 according to a modification of Embodiment 1. As illustrated in FIG. 6, the coding artifacts removing apparatus 600 includes a first filtering target pixel determining unit 601, a second filtering target pixel determining unit 602, a filtering candidate information holding unit 603, switches 604 and 606, and a filtering unit 605.

The filtering candidate information holding unit 603 is the same as the filtering candidate information holding unit 103, and thus performs the same operations as the filtering candidate information holding unit 103. Furthermore, the switch 604 is the same as the switch 105, and thus performs the same operations as the switch 105. Furthermore, the filtering unit 605 is the same as the filtering unit 106, and thus performs the same operations as the filtering unit 106. Furthermore, the switch 606 is the same as the switch 107, and thus performs the same operations as the switch 107.

Furthermore, the first filtering target pixel determining unit 601 corresponds to the first determining unit, and the second filtering target pixel determining unit 602 corresponds to the second determining unit. In other words, the first and second filtering target pixel determining units 601 and 602 correspond to processing units obtained by dividing the filtering target pixel determining unit 102 for a horizontal direction and a vertical direction. Thus, both the first and second filtering target pixel determining units 601 and 602 perform the same operations as the filtering target pixel determining unit 102.

In other words, the first filtering target pixel determining unit 601 determines a filtering target pixel for a vertical edge, based on pixel values of pixels adjacent to the vertical edge. Furthermore, the second filtering target pixel determining unit 602 determines a filtering target pixel for a horizontal edge, based on pixel values of pixels adjacent to the horizontal edge.

According to Embodiment 1, the horizontal and vertical directions are exemplified as, but not limited to, directions in which filtering target pixels are divided. When a block edge is in a diagonal direction, the filtering target pixels may probably be divided in a horizontal direction or a vertical direction with respect to the diagonal direction.

As such, the filtering target pixel determining process (Step S201) is divided in a filtering direction (direction of a block edge), and the divided two processes are performed in parallel with each other. Since the processing time can be reduced, the coding artifacts removing apparatus 600 can reduce the processing time. The difference in processing time between the coding artifacts removing apparatuses 100 and 600 will be described with reference to FIG. 7.

Figure 7:
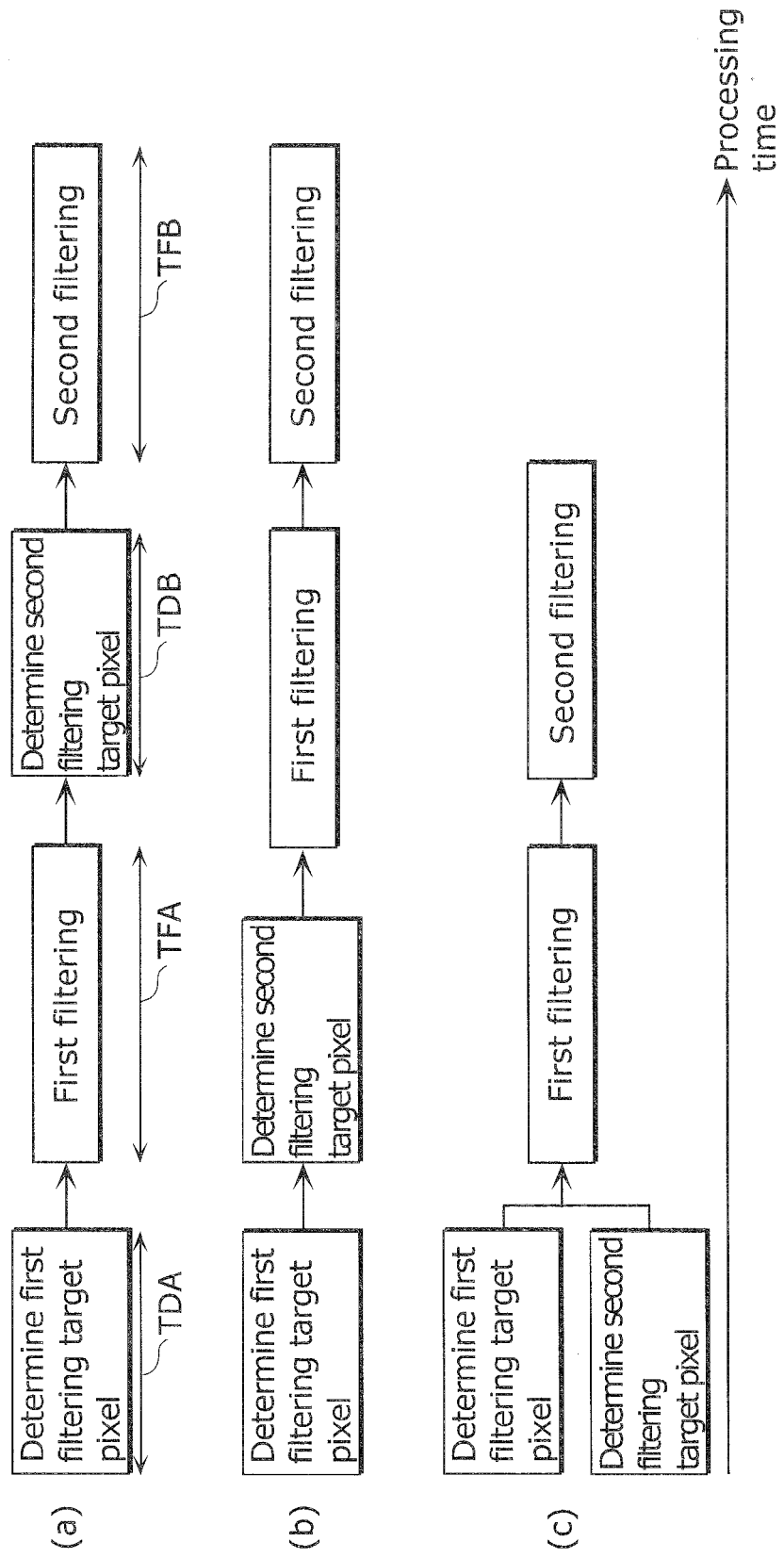
FIG. 7 illustrates a processing time for removing coding artifacts according to the modification of Embodiment 1.

FIG. 7 illustrates each processing time for a coding artifacts removing process according to the modification of Embodiment 1. More specifically, (a) of FIG. 7 conceptually illustrates a processing time using a conventional coding artifacts removing method. Furthermore, (b) of FIG. 7 conceptually illustrates a processing time using a coding artifacts removing method according to Embodiment 1. Furthermore, (c) of FIG. 7 conceptually illustrates a processing time using a coding artifacts removing method according to the modification of Embodiment 1.

Here, TDA denotes a processing time necessary for performing a first filtering target pixel determining process (vertical edge), and TFA denotes a processing time necessary for performing a first filtering process (vertical edge). Furthermore, TDB denotes a processing time necessary for performing a second filtering target pixel determining process (horizontal edge), and TFB denotes a processing time necessary for performing a second filtering process (horizontal edge). Since each of necessary intervals between the processes is much shorter than the processing time necessary for performing each of the processes, it is described herein that the intervals are assumed to be 0.

Since all the processes need to be sequentially performed in the conventional coding artifacts removing method, a processing time necessary for removing coding artifacts is expressed by TDA+TFA+TDB+TFB. Furthermore, as illustrated in (b) of FIG. 7, a processing time necessary for removing coding artifacts using the coding artifacts removing method according to Embodiment 1 is expressed by TDA+TDB+TFA+TFB. In other words, there is no change in processing time necessary for removing coding artifacts between the coding artifacts removing method according to Embodiment 1 and the conventional coding artifacts removing method.

On the other hand, as illustrated in (c) of FIG. 7, a processing time necessary for removing coding artifacts using the coding artifacts removing method according to the modification of Embodiment 1 is expressed by MAX(TDA, TDB)+TFA+TFB. In other words, the process according to the modification of Embodiment 1 can be completed in a period of time shorter than that of the processes using the conventional coding artifacts removing method.

Although filtering is performed in the order from a vertical edge to a horizontal edge, the order may be reversed. Furthermore, the order may be determined in advance by a coding apparatus and a decoding apparatus, or may be switched according to a signal added as header information of a stream. Furthermore, a vertical edge may be filtered simultaneously with filtering of a horizontal edge.

Since the processed images completely match with each other in the configurations of both FIGS. 1 and 6, one of the configurations appropriate for the coding apparatus and the decoding apparatus can be selected. For example, the configuration in FIG. 1 can be selected for standalone software ill-suited to parallel processing, and the configuration in FIG. 6 can be selected for hardware available for the parallel processing. Since the same result of processing is obtained by selecting any of these configurations, the compatibility with the coding apparatus and the decoding apparatus can be maintained, and the practical effects are very significant.

As described above, each of the coding artifacts removing apparatuses 100 and 600 according to Embodiment 1 and the modification thereof in the present invention receives a non-filtered image signal in the process of determining filtering target pixels for the horizontal edge and the vertical edge. Here, each of the filtering candidate information holding units 103 and 603 holds filtering candidate information for identifying the pixels determined as the filtering target pixels. Then, when filtering the image signal in the horizontal and vertical directions, each of the filtering units 106 and 605 filters the determined filtering target pixel by obtaining the filtering candidate information from a corresponding one of the filtering candidate information holding units 103 and 603.

With such operations, each of the coding artifacts removing apparatuses 100 and 600 can determine a filtering target pixel for one of the horizontal edge and the vertical edge, with reference to the non-filtered image signal in a corresponding one of the horizontal and vertical directions. In other words, the coding artifacts removing apparatuses 100 and 600 can overcome the drawbacks of the conventional coding artifacts removing method in which a pixel of an object edge is also determined as a filtering target pixel by determining the filtering target pixel with reference to a filtered image signal. In other words, the coding artifacts removing apparatuses 100 and 600 can implement a coding artifacts removing method in which the probability of degrading the image quality of an image signal will be lower.

Furthermore, each of the coding artifacts removing apparatuses 100 and 600 does not use a filtered image signal in the process of determining a filtering target pixel. Accordingly, the coding artifacts removing apparatus 600 according to the modification of Embodiment 1 can determine filtering target pixels for a horizontal edge and a vertical edge in parallel, and can shorten the time necessary for removing coding artifacts.

Although the aforementioned description is for removing artifacts in a block edge, the processing is not limited to a block unit basis according to H.264 but has the same advantages in removing artifacts on a per conversion processing unit.

Furthermore, although filtering target pixels for both of a vertical edge and a horizontal edge are determined and then the vertical edge and the horizontal edge are filtered according to Embodiment 1, the processing does not necessarily have to be performed in this way. For example, after a filtering target pixel for a vertical edge is determined and the vertical edge is filtered, a filtering target pixel for a horizontal edge may be determined and the horizontal edge may be filtered. Here, pixel values of non-filtered pixels for the vertical edge need to be held in a memory, etc.

Furthermore, the processes of determining a filtering target pixel and filtering are performed, but not limited to, per line.

Embodiment 2

Next, Embodiment 2 according to the present invention will be described. More specifically, Embodiment 2 describes a method of determining a filtering target pixel that is a different method from the method of determining a filtering target pixel according to Embodiment 1. Furthermore, the filtering method will be described in detail. Since a coding artifacts removing apparatus according to Embodiment 2 is the same as that in FIG. 1 according to Embodiment 1, the illustration thereof will be omitted.

The method of determining a filtering target pixel will be described in detail using pixels p3, p2, p1, p0, q0, q1, q2, and q3 that are included in a processing line that extends in a filtering direction as illustrated in FIG. 3C. The value of each pixel is denoted by a pixel index.

Embodiment 1 exemplifies the method of determining a filtering target pixel with reference to only pixel values of pixels adjacent to a block edge. However, the method may be changed according to, for example, a method of generating an image signal. For example, when a signal coded using intra prediction is used, a filtering target pixel may be determined using a relationship between pixel values of pixels in a wide range (for example, p2, p1, p0, q0, q1, and q2), and in other cases, a filtering target pixel may be determined using a relationship between pixel values of pixels in a narrow range (for example, p1, p0, q0, and q1).

Hereinafter, an example of switching between the methods of determining a filtering target pixel, according to the method of generating an image signal will be described.

Figure 8:
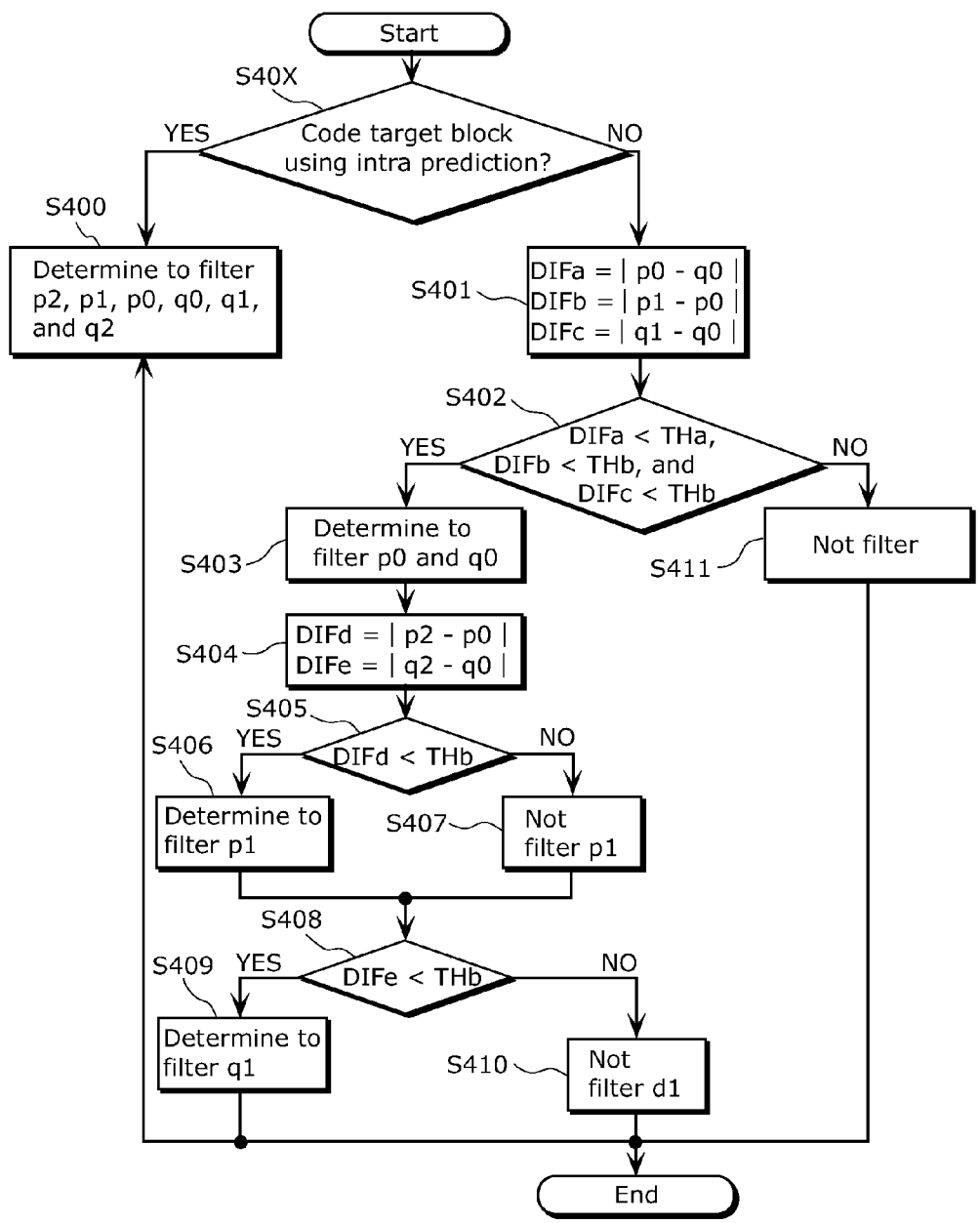
FIG. 8 is a flowchart indicating an example of a method of determining a filtering target pixel according to Embodiment 2 in the present invention.

FIG. 8 is a flowchart indicating an example of the method of determining a filtering target pixel according to Embodiment 2.

First, the filtering target pixel determining unit 102 examines whether or not pixel values of two blocks adjacent to a block edge are coded using intra prediction (Step S40X). Here, when at least one of the two blocks adjacent to the block edge is coded using intra prediction (Yes at Step S40X), the filtering target pixel determining unit 102 determines to filter the pixels p2, p1, p0, q0, q1, and q2 (Step S400). In other words, the filtering target pixel determining unit 102 determines the pixels p2, p1, p0, q0, q1, and q2 as filtering target pixels.

On the other hand, when both of the two blocks adjacent to the block edge are coded using motion compensated prediction (No at Step S40X), the filtering target pixel determining unit 102 calculates absolute differences DIFa, DIFb, and DIFc in FIG. 8, using the pixels p0, p1, q0, and q1 adjacent to the block edge (Step S401). Next, the filtering target pixel determining unit 102 compares the calculated absolute differences DIFa, DIFb, and DIFc with thresholds THa and THb given in a predetermined method (for example, values determined by a quantization step value to be used in coding and decoding) (Step S402).

Here, when none of three conditions at Step S402 is satisfied (No at Step S402), the filtering target pixel determining unit 102 determines not to filter the pixels included in the processing line (Step S411). In other words, the filtering target pixel determining unit 102 determines the pixels p2, p1, p0, q0, q1, and q2 as non-filtered target pixels.

On the other hand, when all the three conditions at Step S402 are satisfied (Yes at Step S402), the filtering target pixel determining unit 102 determines to filter the pixels p0 and q0 (Step S403). In other words, the filtering target pixel determining unit 102 determines the pixels p0 and q0 as filtering target pixels. Next, the filtering target pixel determining unit 102 calculates the absolute difference DIFd using the pixels p2 and p0, and the absolute difference DIFe using the pixels q2 and q0. The pixels herein are adjacent to the block edge (Step S404).

Next, the filtering target pixel determining unit 102 compares the calculated absolute difference DIFd with the threshold THb that is given in the predetermined method (Step S405). Here, when the condition at Step S405 is satisfied (Yes at Step S405), the filtering target pixel determining unit 102 determines to filter the pixel p1 (Step S406). In other words, the filtering target pixel determining unit 102 determines the pixel p1 as a filtering target pixel.

On the other hand, when the condition at Step S405 is not satisfied (No at Step S405), the filtering target pixel determining unit 102 determines not to filter the pixel p1 (Step S407). In other words, the filtering target pixel determining unit 102 determines the pixel p1 as a non-filtered target pixel.

Next, the filtering target pixel determining unit 102 compares the calculated absolute difference DIFe with the threshold THb that is given in the predetermined method (Step S408). Here, when the condition at Step S408 is satisfied (Yes at Step S408), the filtering target pixel determining unit 102 determines to filter the pixel q1 (Step S409). In other words, the filtering target pixel determining unit 102 determines the pixel q1 as a filtering target pixel.

On the other hand, when the condition at Step S408 is not satisfied (No at Step S408), the filtering target pixel determining unit 102 determines not to filter the pixel q1 (Step S410).

In other words, the filtering target pixel determining unit 102 determines the pixel q1 as a non-filtered target pixel.

The filtering target pixel determining unit 102 determines whether or not to filter each of the p1, q0, p0, and q1 by performing the aforementioned processes.

In other words, the coding artifacts removing apparatus 100 according to Embodiment 2 can determine a position of an object edge by performing the processes, determine not to filter a pixel corresponding to the object edge, and prevent the object edge from becoming a blurred image through filtering.

Hereinafter, an example of a method of determining the thresholds THa and THb that are described in Embodiments 1 and 2 in order to judge whether an edge is an object edge will be described hereinafter. The thresholds are determined in the same method in coding and decoding processes.

The coding artifacts occurring in coding are mainly caused by quantizing a difference signal. Thus, the coding artifacts increase when the quantization precision is low, whereas the coding artifacts decrease when the quantization precision is high. Thus, the thresholds THa and THb may be determined using a value QP according to Equation 1. The value QP indicates, for example, the quantization precision to be used for coding and decoding (the quantization precision is lower as QP increases). Here, the thresholds THa and THb are determined to satisfy the relationship THa<THb.

[Math. 1]

$$TH_a = 0.8 \cdot (2^{(QP+OffsetA)/6} + 1)$$

$$TH_b = 0.5 \cdot (QP + OffsetB) - 7 \quad \text{(Equation 1)}$$

Here, OffsetA and OffsetB are values for adjustment, and may be described in a bit stream per stream, frame, or slice.

The method of determining a threshold using Equation 1 is one example. In other words, as long as an equation enables determining a threshold to be larger as the quantization step value or the value QP is larger, the threshold may be determined using any equation. Furthermore, assuming that a table having values obtained by Equation 1 may be managed by a coding apparatus and a decoding apparatus, coding artifacts may be removed with reference to the table. Furthermore, for example, assuming that the portions "0.8" and "0.5" in Equation 1 are denoted by variables a and b, the variables a and b may be described in a bit stream per stream or frame.

In such a manner, the precision of determining whether change in pixel values in a block edge is change in pixel values due to an object edge or change in pixel values due to coding artifacts can be improved.

Next, the method of filtering the filtering target pixels determined in the above manner will be described in detail.

As described in Embodiment 1, when, for example, an image signal of an original image in (a) of FIG. 5 is coded per block, as illustrated in (b) of FIG. 5, blocking artifacts occur such that pixel values are sequentially and smoothly changed within a block, and pixel values are non-sequentially changed only in a block edge. Here, the pixel values are corrected to be sequential in the block edge part through filtering, as illustrated in (c) of FIG. 5, so that the blocking artifacts caused by the coding can be reduced.

Here, pixel values of pixels q1, q0, p0, and p1 are denoted as q1, q0, p0, and p1, respectively. Furthermore, pixel values of filtered pixels q'1, q'0, p'0, and p'1 corresponding to the pixels q1, q0, p0, and p1 are denoted as q'1, q'0, p'0, and p'1, respectively. Here, the filtering is performed according to Equation 2.

[Math. 2]

$p'0 = c_{0,0} \cdot p1 + c_{0,1} \cdot p0 + c_{0,2} \cdot q0 + c_{0,3} \cdot q1$ $p'1 = c_{1,0} \cdot p2 + c_{1,1} \cdot p1 + c_{1,2} \cdot p0 + c_{1,3} \cdot q0$ $q'0 = c_{0,0} \cdot q1 + c_{0,1} \cdot q0 + c_{0,2} \cdot p0 + c_{0,3} \cdot p1$ $q'1 = c_{1,0} \cdot q2 + c_{1,1} \cdot q1 + c_{1,2} \cdot q0 + c_{1,3} \cdot q1$ (Equation 2)

Here, $c_{0,0}$, $c_{0,1}$, $c_{0,2}$, $c_{0,3}$, $c_{1,0}$, $c_{1,1}$, $c_{1,2}$, and $c_{1,3}$ are filter coefficients, and are expressed by, for example, Equation 3.

[Math. 3]

$$\{c_{0,0}, c_{0,1}, c_{0,2}, c_{0,3}\} = \left\{\frac{1}{8}, \frac{1}{2}, \frac{1}{2}, -\frac{1}{8}\right\}$$
$$\{c_{1,0}, c_{1,1}, c_{1,2}, c_{1,3}\} = \left\{\frac{7}{16}, \frac{3}{16}, \frac{5}{16}, \frac{1}{16}\right\}$$ (Equation 3)

Filtering using a filter coefficient according to Equation 3 smoothes a signal in (b) of FIG. 5 to a signal in (c) of FIG. 5. The filter coefficient is not limited to Equation 3 but may be a simplified filter coefficient as Equation 4.

[Math. 4]

$$\{c_{0,0}, c_{0,1}, c_{0,2}, c_{0,3}\} = \left\{\frac{1}{4}, \frac{1}{4}, \frac{1}{4}, \frac{1}{4}\right\}$$
$$\{c_{1,0}, c_{1,1}, c_{1,2}, c_{1,3}\} = \left\{\frac{1}{4}, \frac{1}{4}, \frac{1}{4}, \frac{1}{4}\right\}$$ (Equation 4)

Although the filter coefficient in Equation 4 has a higher smoothing level and information originally included in an input image signal is sometimes lost, the processing amount for filtering can be largely reduced.

The same value may be set between a coding apparatus and a decoding apparatus in advance as a filter coefficient to be used for filtering (for example, a value obtained by Equation 3), or the filter coefficient may be recorded per stream, frame, or slice. Furthermore, filtering may be performed by adaptively switching between filter coefficients of different kinds (for example, values obtained by Equations 3 and 4).

The switching of such filter coefficients may depend on the quantization precision, in the same manner as determining of a filtering target pixel. For example, when coding is performed with a lower quantization precision, since a difference between segmentation edges in a reference image MC is larger, the filter coefficient with a higher smoothing level (for example, a value obtained by Equation 4) is used to perform filtering. In contrast, when coding is performed with a higher quantization precision, the filter coefficient with a lower smoothing level (for example, a value obtained by Equation 3) is used to perform filtering in order not to lose information on an original signal. Accordingly, the coding artifacts removing apparatus 100 can effectively remove coding artifacts and improve the image quality.

As described above, the coding artifacts removing apparatus 100 according to Embodiment 2 can effectively remove coding artifacts by determining a filtering target pixel and filtering the pixel, in consideration of the coding artifacts and an object edge.

Although Embodiment 2 describes filtering two filtering target pixels at both sides of a block edge, three pixels at each of the sides may be filtered by increasing the number of filter coefficients.

Embodiment 3

Next, Embodiment 3 according to the present invention will be described. The other examples of a method of determining a filtering target pixel will be described in Embodiment 3. Furthermore, the advantages produced by the method of removing coding artifacts according to Embodiment 3 will be described in comparison with a conventional method (HM 0.9 software) (http://hevc.kw.bbc.co.uk/trac/browser/tags/0.9). Unless otherwise described, a filtering target pixel determining unit determines a filtering target pixel (determining process), and a filtering unit filters the filtering target pixels (filtering process).

Figures 9, 10:
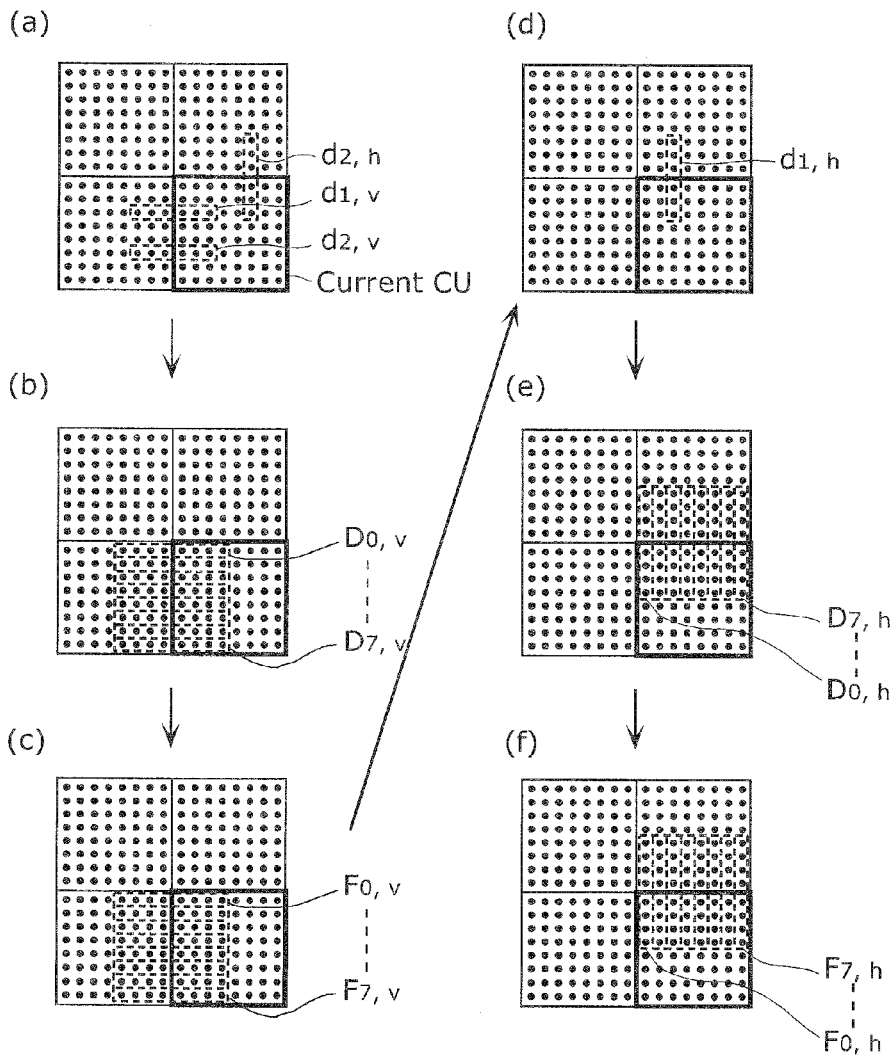
FIG. 9 illustrates a vertical edge part according to Embodiment 3 in the present invention.
FIG. 10 illustrates 6 sequential steps in a conventional coding artifacts removing method.

FIG. 9 illustrates a vertical edge part according to Embodiment 3. In the vertical edge part, "A" denotes a group of pixels on the left side, and "B" denotes a group of pixels on the right side. Furthermore, in the case of a horizontal edge part, "A" denotes a group of pixels on the upper side, and "B" denotes a group of pixels on the lower side.

The determining process and the filtering process to be performed in each edge part will be described hereinafter.

First, whether or not a condition of Equation 5 is satisfied is calculated.

[Math. 5]

$|p2_2 - 2 \cdot p1_2 + p0_2| + |q2_2 - 2 \cdot q1_2 + q0_2| + |p2_5 - 2 \cdot p1_5 + p0_5| + |q2_5 - 2 \cdot q1_5 + q0_5| < \beta$ (Equation 5)

The first left part of Equation 5 for calculation (the determining process) of Equation 6 is denoted as $d_{1,v}$ in the case of vertical edges and as $d_{1,h}$ in the case of horizontal edges. Furthermore, the second left part of Equation 5 for calculation (the determining process) of Equation 7 is denoted as $d_{2,v}$ in the case of vertical edges and as $d_{2,h}$ in the case of horizontal edges.

[Math. 6]

$|p2_2 - 2 \cdot p1_2 + p0_2| + |q2_2 - 2 \cdot q1_2 + q0_2|$ (Equation 6)

[Math. 7]

$|p2_5 - 2 \cdot p1_5 + p0_5| + |q2_5 - 2 \cdot q1_5 + q0_5|$ (Equation 7)

If Equation 5 is true, it is determined that filtering is applied to the edge part. Furthermore, the determining process for determining between a so-called strong filter and a so-called weak filter to be used for the filtering process is performed for each of the eight lines included in an edge part with i=0, . . . , 7. The determining process is performed by calculating Equation 8.

[Math. 8]

$d < (\beta >> 2)$ and $(|p3_1 - p0_1| + |q0_1 - q3_1|) < (\beta >> 3)$ and $|p0_1 - q0_1| < ((S \cdot t_C + 1) >> 1)$ (Equation 8)

If Equation 8 is true, the strong filter is applied, otherwise the weak filter. The calculation (determining) process in each of the lines in Equation 8 is denoted as $D_{i,v}$ in the case of vertical edges and as $D_{i,h}$ in the case of horizontal edges.

Among the filtering processes of the weak filter and the strong filter, the filtering process using the weak filter in Equation 9 requires most sequential operations.

[Math. 9]

$$\Delta = \text{Clip}(-t_c, t_c, \\ (13 \cdot (q0_i - p0_i) + 4 \cdot (q1_i - p1_i) - 5 \cdot (q2_i - p2_i) + 16) \gg 5)$$

$$p1_i = \text{Clip}\left(0, 255, p1, +\frac{\Delta}{2}\right)$$

(Equation 9)

The filtering processes are denoted as $F_{i,v}$ in the case of vertical edges and as $F_{i,h}$ in the case of horizontal edges.

Next, the number of sequential operations in a critical path with respect to the determining and filtering processes ($d_{1,v}$, $d_{1,h}$, $d_{2,v}$, $d_{2,h}$, $D_{i,v}$, $D_{i,h}$, $F_{i,v}$, and $F_{i,h}$) will be described by comparing the conventional coding artifacts removing method with the coding artifacts removing method according to Embodiment 3. Hereinafter, 8×8 pixels are used as the size of a block that is a processing unit.

In the conventional coding artifacts removing method, the following 6 sequential steps are necessary for the determining and filtering processes.
1. Determining processes $d_{1,v}$, $d_{2,v}$, and $d_{2,h}$
2. Determining process $D_{i,v}$ with i=1, . . . , 8
3. Filtering process $F_{i,v}$ with i=1, . . . , 8
4. Determining process $d_{1,h}$
5. Determining process $D_{i,h}$ with i=1, . . . , 8
6. Filtering process $F_{i,h}$ with i=1, . . . , 8

FIG. 10 illustrates these 6 sequential steps in the conventional coding artifacts removing method. In FIG. 10, a block to the lower right is a current block, and other blocks are previous blocks. Here, the coding artifacts removing process is performed on a vertical edge between the lower right block and the lower left block and a horizontal edge between the lower right block and the upper right block. In each of (a) to (f) in FIG. 10, a region enclosed by a broken line indicates pixels on which each process is performed.

Hereinafter, the number of sequential operations in the determining and filtering processes will be described.

FIG. 11A illustrates the number of sequential operations in the determining process $d_{1,v}$. As illustrated in FIG. 11A, the determining process $d_{1,v}$ requires 4 sequential operations. Furthermore, the determining processes $d_{1,h}$, $d_{2,v}$, and $d_{2,h}$ are performed in the same manner. The addition $d_{1,v}+d_{2,v}$ and the subsequent comparison against β require two additional sequential operations.

FIG. 11B illustrates the number of sequential operations in the determining process $D_{i,v}$. As illustrated in FIG. 11B, the determining process $D_{i,v}$ requires 6 sequential operations. The determining process $D_{i,h}$ is performed in the same manner.

FIG. 11C illustrates the number of sequential operations in the filtering process $F_{i,v}$. As illustrated in FIG. 11C, the filtering process $F_{i,v}$ requires 10 sequential operations. The determining process $F_{i,h}$ is performed in the same manner.

Figure 12:
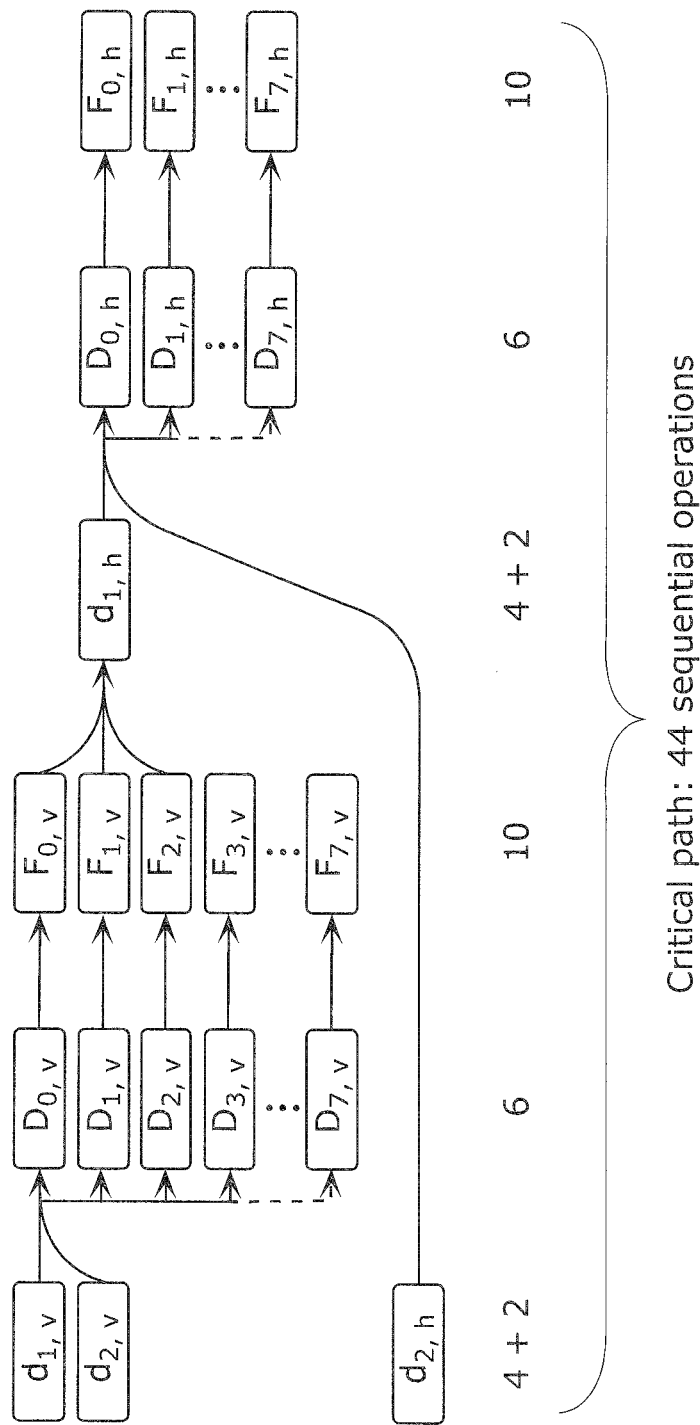
FIG. 12 illustrates dependencies between processes and the number of sequential operations in a critical path, in a conventional coding artifacts removing method.

FIG. 12 illustrates dependencies between the processes and the number of sequential operations in a critical path, in a conventional coding artifacts removing method. More specifically, FIG. 12 illustrates the dependencies between determining processes and filtering processes. By adding up the numbers of sequential operations in each of the required operations, it can be seen that there are in total 44 sequential operations in the critical path.

As described with reference to FIGS. 10 to 12, the determining and filtering processes for the vertical and horizontal edges have dependencies on each other in the conventional coding artifacts removing method. These dependencies limit the capabilities for parallel processing and thus lead to a large amount of sequential operations required in the critical path. In other words, the parallel processing in the conventional coding artifacts removing method makes it difficult to shorten the processing time.

Next, the coding artifacts removing method according to Embodiment 3 will be described, by which the number of sequential operations in the critical path can be further reduced than that by the conventional method.

In the coding artifacts removing method according to Embodiment 3, each of the determining processes $d_{1,v}$, $d_{1,h}$, $d_{2,v}$, $d_{2,h}$, $D_{i,v}$, and $D_{i,h}$ is performed based on a non-filtered image signal. This dissolves the dependencies which are currently leading to the large number of sequential operations in the critical path.

More specifically, only the following 4 sequential steps are necessary in the determining and filtering processes in the coding artifacts removing method according to Embodiment 3.
1. Determining processes $d_{1,v}$, $d_{2,v}$, $d_{1,h}$, and $d_{2,h}$
2. Determining processes $D_{i,v}$ with i=1, . . . , 8 and $D_{i,h}$ with i=1, . . . , 8
3. Filtering processes $F_{i,v}$ with i=1, . . . , 8 and $F_{i,h}$ with i=1, . . . , 4
4. Filtering process $F_{i,h}$ with i=5, . . . , 8

FIG. 13 illustrates 4 sequential steps in the coding artifacts removing method according to Embodiment 3. As illustrated in FIG. 13, each of the determining processes $d_{1,v}$, $d_{1,h}$, $d_{2,v}$, $d_{2,h}$, $D_{i,v}$, and $D_{i,h}$ is performed based on a non-filtered signal. Thus, the dependencies between $d_{1,v}$, $d_{1,h}$, $d_{2,v}$, and $d_{2,h}$ and the dependencies between $D_{i,v}$ and $D_{i,h}$ are dissolved, and the parallel processing capabilities are increased.

Figure 14:
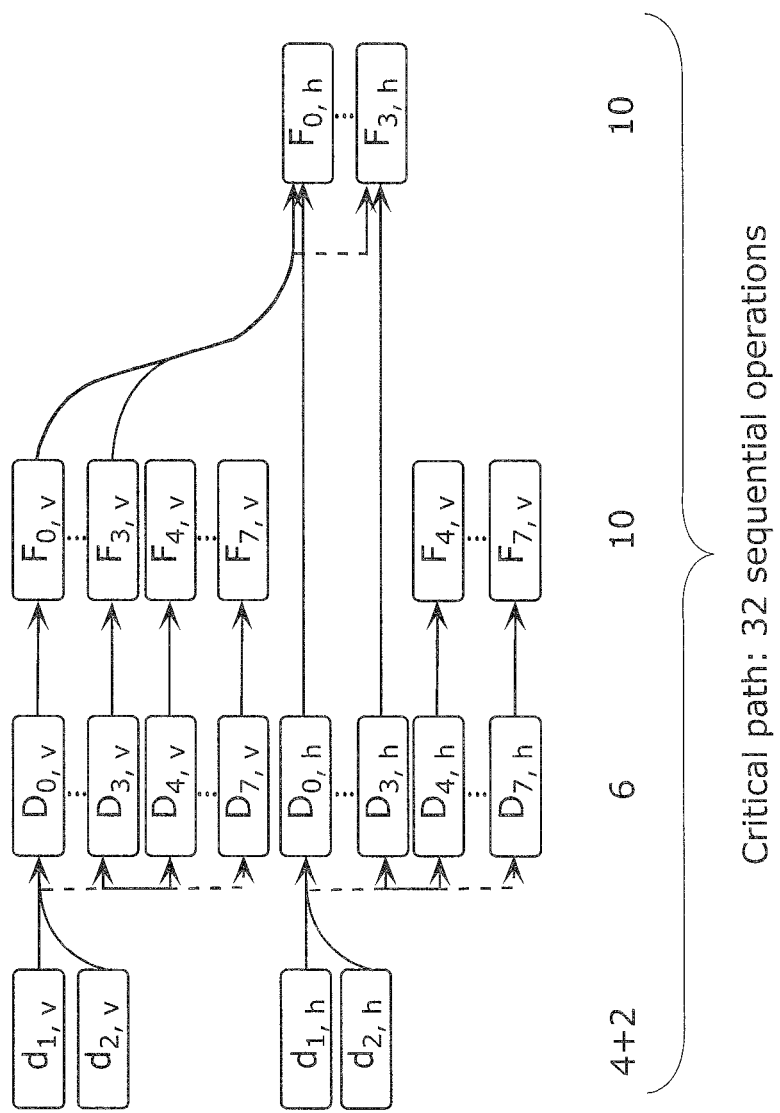
FIG. 14 illustrates dependencies between each process and the number of sequential operations in a critical path, in the coding artifacts removing method according to Embodiment 3.

FIG. 14 illustrates dependencies between the processes and the number of sequential operations in the critical path, in the coding artifacts removing method according to Embodiment 3. As illustrated in FIG. 14, with the coding artifacts removing method according to Embodiment 3, the numbers of sequential operations in the critical path is reduced from 44 that is a result of the conventional method to only 32. This is a reduction of around 30%.

Embodiment 4

Next, Embodiment 4 according to the present invention will be described.

Embodiments 1 to 3 describes the coding artifacts removing apparatus that determines a filtering target pixel with reference to pixel values of non-filtered pixels included in the current block. Embodiment 4 describes a coding artifacts removing apparatus that determines a filtering target pixel with reference to pixel values of non-filtered pixels included in a processed block adjacent to the current block.

Before describing the coding artifacts removing apparatus according to Embodiment 4, a hierarchized processing unit (multilayer block structure) will be described.

First, the video coding standard that is being studied by the Joint Collaborative Team on Video Coding (JCT-VC) will be described. The JCT-VC is a joint collaborative group of the International Telecommunication Union-Telecommunication Standardization Sector (ITU-T) and the Moving Picture Experts Group (MPEG).

Among the tools proposed by each of the groups, the JCT-VC calls a collection of techniques that are highly likely to be included in the video coding standard, the Test Model Under Consideration (TMuC). The documents and software belonging to such techniques are being organized as the TMuC.

One of the basic techniques of the TMuC is a technique using the hierarchized processing unit (multilayer block structure). The processing unit is hierarchized so that a processing unit is divided into smaller processing units and the smaller processing unit is further divided into smaller processing units. As the processing unit is smaller, the level with the processing unit is deeper, is in a lower hierarchical level, and is indicated by a larger value. Conversely, as the processing unit is larger, the level with the processing unit is shallower, is in an upper hierarchical level, and is indicated by a smaller value.

Figure 15:
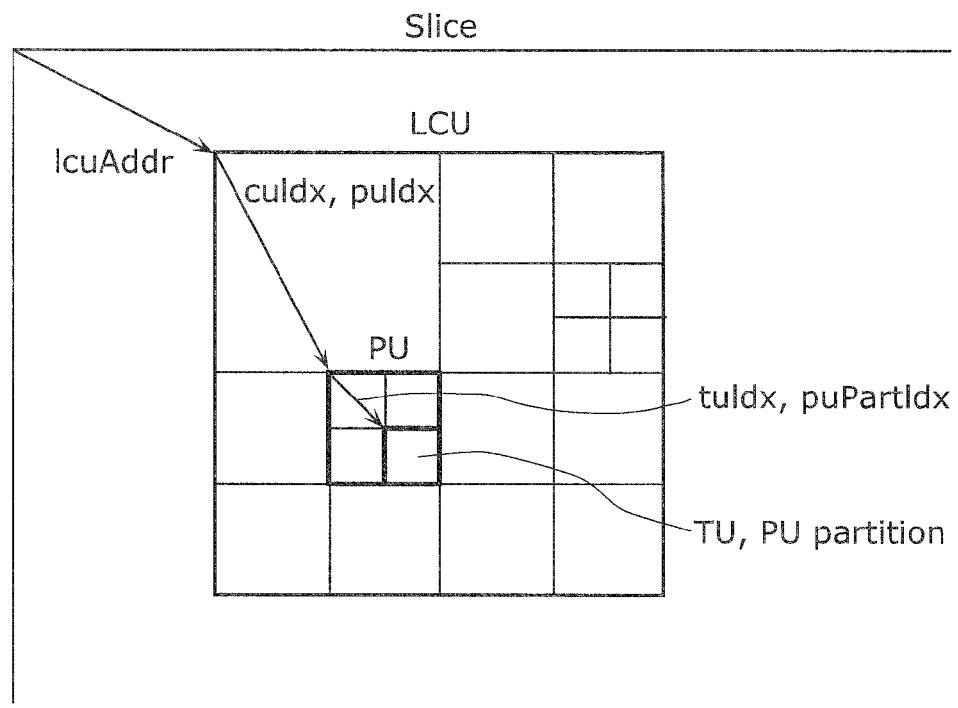
FIG. 15 illustrates a hierarchized processing unit (multi-layer block structure).

FIG. 15 illustrates the hierarchized processing unit (multilayer block structure). The processing unit includes a coding unit (CU), a prediction unit (PU), and a transform unit (TU). Pictures are divided into slices. A slice is a sequence of largest coding units (LCU).

The LCU is a largest CU allowed in a slice. The LCU has various sizes (for example, 16×16 pixels, 32×32 pixels, and 64×64 pixels). The location of the largest coding unit is specified by the largest coding unit address "lcuAddr".

The CU has various sizes (for example, 8×8 pixels and 16×16 pixels), and is a unit equivalent to a conventional macroblock. The CU is recursively divided into four coding units. The location of the CU is specified by the coding unit index "cuIdx" relative to the upper-left pixel of the LCU.

The PU is a basic unit for specifying an inter picture prediction process. The size of the PU is as large as or smaller than that of the CU. The location of the PU is specified by the coding unit index "puIdx" relative to the upper-left pixel of the CU.

Furthermore, the PU has multiple partitions which may have arbitrary shapes (for example, 16×16 pixels, 16×8 pixels, and 8×16 pixels). The location of the partition is specified in advance by mode information "part Mode (PUType)" indicating a shape of the partition.

The TU is a basic unit for specifying orthogonal transformation and quantization. The TU is as large as the PU, or smaller than the PU by one hierarchical level. The location of the TU is specified by the transform unit index "tuIdx" relative to the upper-left pixel of the PU.

Figure 16A:
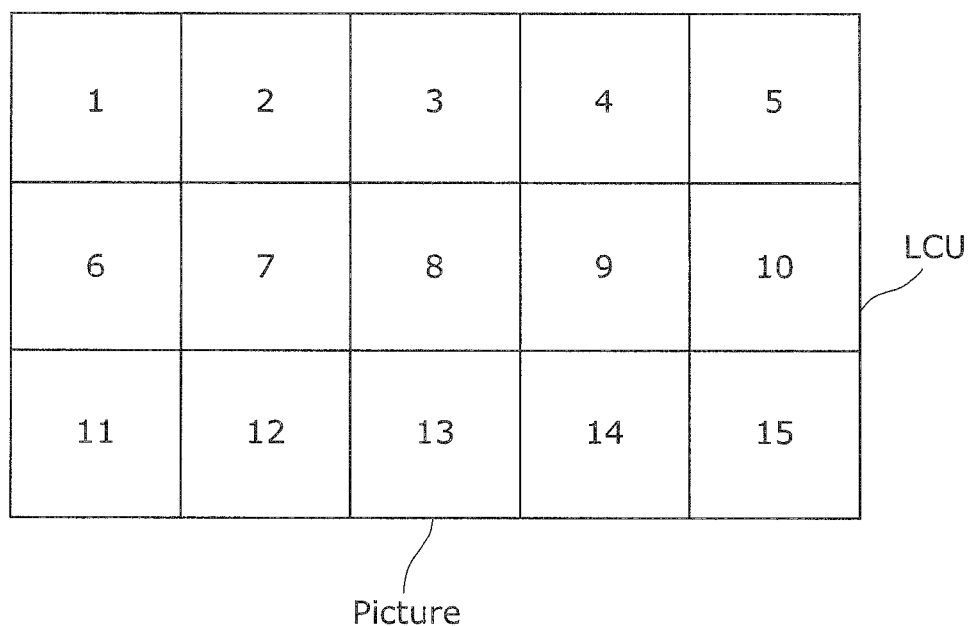
FIG. 16A illustrates an example of a processing order in an LCU.
Figure 16B:
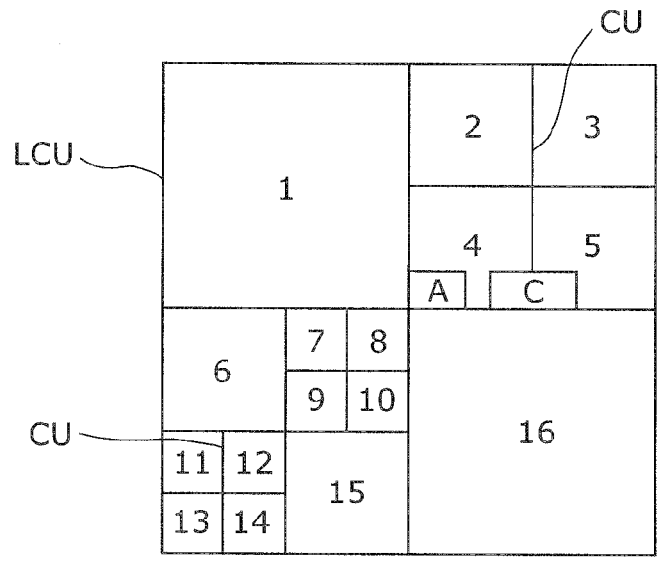
FIG. 16B illustrates an example of a processing order of coding units in an LCU.

FIG. 16A illustrates an example of the processing order in the LCU. Furthermore, FIG. 16B illustrates an example of the processing order of coding units in an LCU. In FIGS. 16A and 16B, the numeric characters in a processing unit indicates the processing order. When each unit is processed in such a processing order, the coding artifacts removing process is performed on a vertical edge and a horizontal edge between the coding units, the prediction units, or the transform units.

Figure 16C:
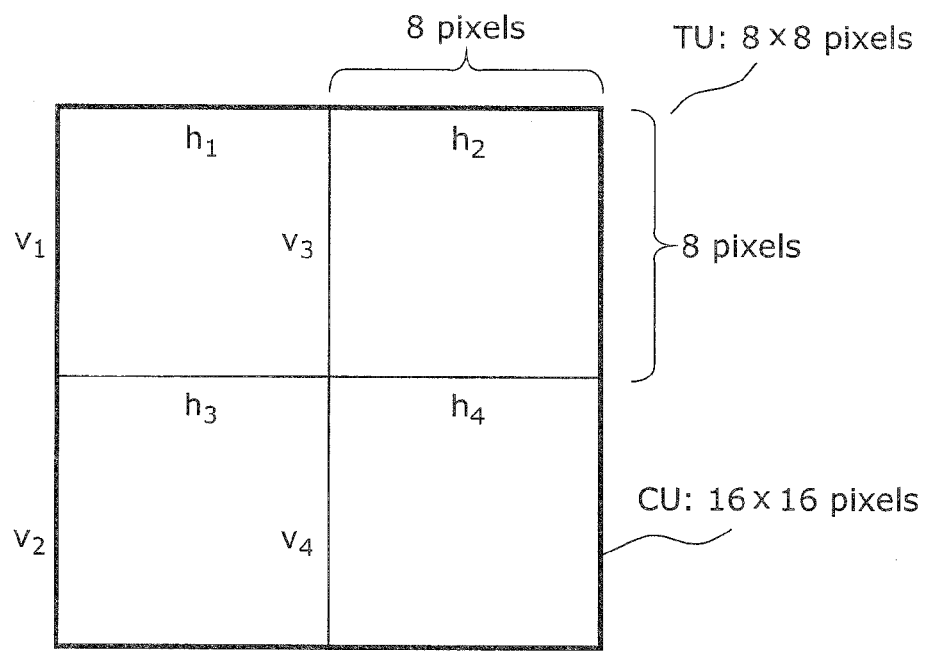
FIG. 16C illustrates an example of a processed edge from which coding artifacts are to be removed.

FIG. 16C illustrates an example of a processed edge from which the coding artifacts are removed. More specifically, FIG. 16C illustrates four vertical edges $v_1$ to $v_4$ and four horizontal edges $h_1$ to $h_4$ that correspond to processed edges between four transform units included in the CU.

The coding artifacts are removed from the vertical edge from top to bottom and then, from left to right in order. Furthermore, the coding artifacts are removed from the horizontal edge from left to right and then, from top to bottom in order.

In view of the hierarchized processing unit, the coding artifacts removing apparatus according to Embodiment 4 will be described.

Figure 17:
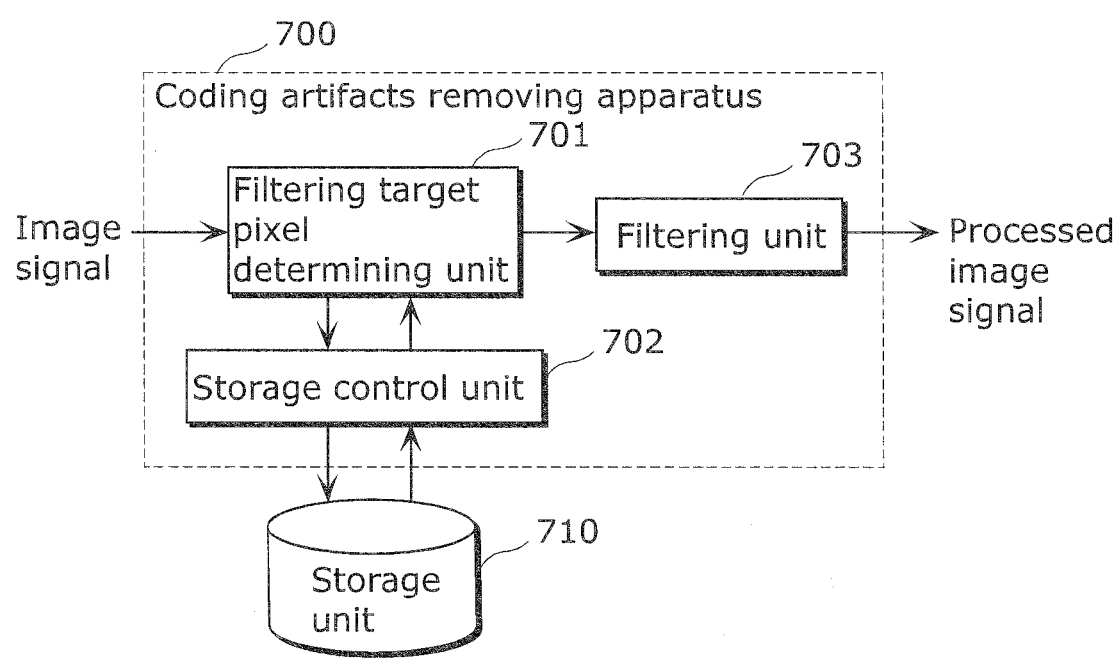
FIG. 17 is a block diagram illustrating a functional configuration of a coding artifacts removing apparatus according to Embodiment 4 in the present invention.

FIG. 17 is a block diagram illustrating a functional configuration of a coding artifacts removing apparatus according to Embodiment 4.

A coding artifacts removing apparatus 700 removes coding artifacts from a first processed edge and a second processed edge that are processed edges for an image signal and are in different directions. As illustrated in FIG. 17, the coding artifacts removing apparatus 700 includes a filtering target pixel determining unit 701, a storage control unit 702, and a filtering unit 703.

The image signal according to Embodiment 4 is an image signal coded based on a first processing unit and second processing units obtained by dividing the first processing unit. The first processing unit is, for example, an LCU, and the second processing unit is, for example, a CU.

The filtering target pixel determining unit 701 determines a filtering target pixel for a processed edge per second processing unit, based on pixel values of adjacent pixels of the processed edge of the second processing unit. Here, the filtering target pixel determining unit 701 reads, from a storage unit 710, pixel values of processed pixels included in the second processing unit, from among the adjacent pixels. The storage unit 710 stores pixel values of non-filtered pixels. In other words, the filtering target pixel determining unit 701 determines a filtering target pixel for adjacent pixels included in a second processing unit that are being processed and adjacent pixels included in a second processing unit that have been processed, based on the pixel values of the non-filtered pixels.

The storage control unit 702 controls reading of data from the storage unit 710 and writing of data to the storage unit 710. According to Embodiment 4, when the current second processing unit and the next second processing unit are separately included in different first processing units, after the filtering target pixel is determined, the storage control unit 702 determines that the pixel values stored in the storage unit 710 can be deleted. Here, the second processing units are processing units obtained by dividing the first processing unit.

The filtering unit 703 filters the filtering target pixel determined by the filtering target pixel determining unit 701.

Next, various operations of the coding artifacts removing apparatus 700 with such a configuration will be described. The first processing unit is an LCU, and the second processing unit is a CU in the following description as an example. The coding artifacts removing method according to Embodiment 4 is not necessarily based on such processing units, but may use, for example, a CU as the first processing unit, and a TU as the second processing unit.

Figure 18:
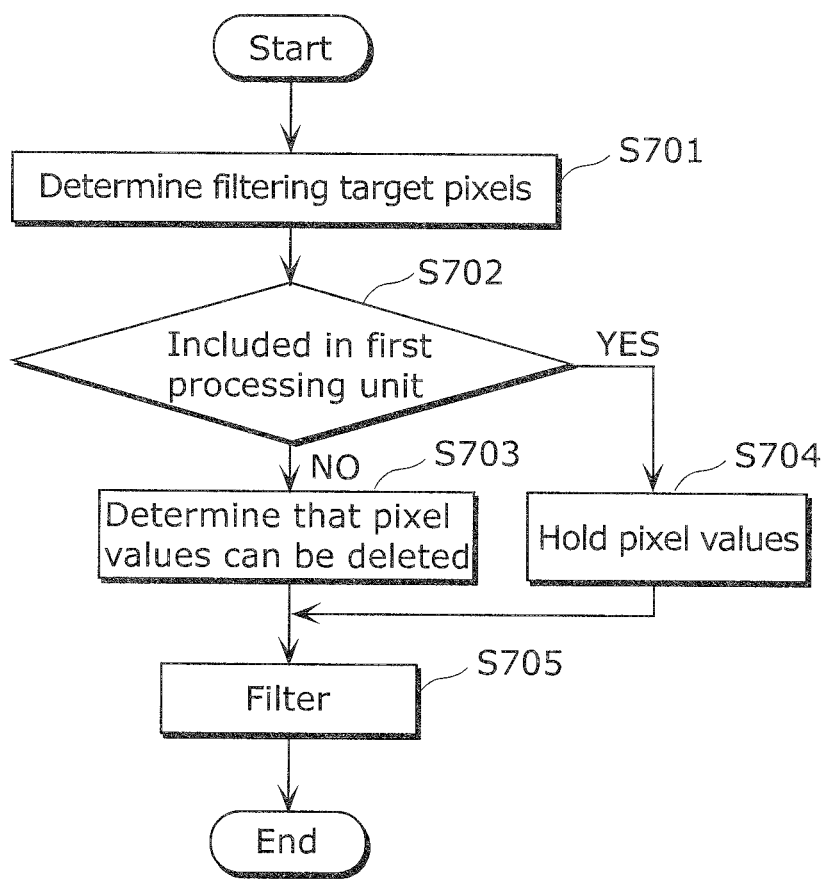
FIG. 18 is a flowchart indicating operations of the coding artifacts removing apparatus according to Embodiment 4.

FIG. 18 is a flowchart indicating operations of the coding artifacts removing apparatus according to Embodiment 4. The procedure in this flowchart is repeatedly performed for each CU. Furthermore, when the processes start, it is assumed that pixel values of pixels included in the current and previous blocks are stored in the storage unit 710.

First, the filtering target pixel determining unit 701 determines a filtering target pixel for each of a vertical edge and a horizontal edge (Step S701). Here, the filtering target pixel determining unit 701 determines the filtering target pixels, based on pixel values of non-filtered adjacent pixels that are stored in the storage unit 710.

Next, the storage control unit 702 determines whether or not the current CU and the next CU are included in the same LCU (Step S702). In other words, the storage control unit 702 determines whether or not the next CU is within the current LCU.

When the current CU and the next CU are included in different LCUs (No at Step S702), the storage control unit 702 determines that the pixel values of the non-filtered pixels stored in the storage unit 710 can be deleted (Step S703). On the other hand, when the current CU and the next CU are included in the same LCU (Yes at Step S702), the storage control unit 702 holds the pixel values of the non-filtered pixels stored in the storage unit 710 as they are.

Next, the filtering unit 703 filters the determined filtering target pixels (Step S705). Here, the filtering may be performed before Step S702.

Hereinafter, the coding artifacts removing method will be described in more detail with reference to FIGS. 16B and 19.

Figure 19:
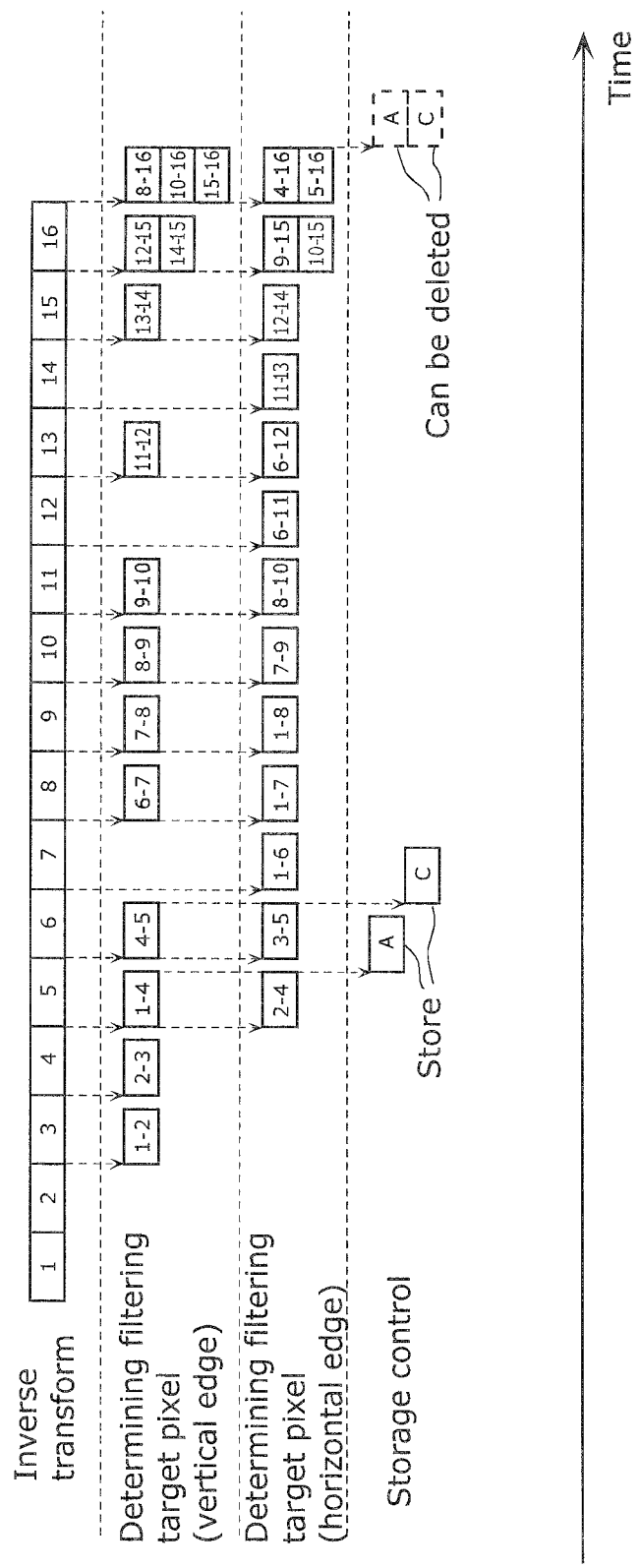
FIG. 19 illustrates a coding artifacts removing method according to Embodiment 4.

FIG. 19 illustrates the coding artifacts removing method according to Embodiment 4. FIG. 19 illustrates timing at which each processing is performed for each CU.

For example, after an inverse transform is performed on the fourth CU, the filtering target pixel determining unit 701 determines filtering target pixels for a vertical edge between the first CU and the fourth CU, and filtering target pixels for a horizontal edge between the second CU and the fourth CU.

Then, the storage control unit 702 stores pixel values of non-filtered pixels that are pixel values of pixels A (FIG. 16B) determined as the filtering target pixels for the vertical edge between the first CU and the fourth CU.

Furthermore, the storage control unit 702 stores pixel values of non-filtered pixels that are pixel values of pixels C (FIG. 16B) determined as filtering target pixels for the vertical edge between the fourth CU and the fifth CU.

The filtering target pixel determining unit 701 determines filtering target pixels for a horizontal edge between the fourth CU, the fifth CU, and the sixteenth CU, based on the pixel values of the pixels A and C stored in the storage unit 710 as described above.

Then, since the current CU (the sixteenth CU) and the next CU are included in different LCUs, the storage control unit 702 determines that the pixel values of the pixels A and C included in the previous CUs (the fourth and fifth CUs) can be deleted.

As described above, the coding artifacts removing apparatus 700 according to Embodiment 4 can determine a filtering target pixel with reference to pixel values of non-filtered pixels even for adjacent pixels included in a processed processing unit. Accordingly, the coding artifacts removing process in which the probability of degrading the image quality of an image signal will be lower can be performed.

Furthermore, the coding artifacts removing apparatus 700 according to Embodiment 4 can determine that pixel values of non-filtered pixels included in a processed second processing unit and stored in the storage unit 710 can be deleted, when a first processing unit including the second processing unit that is being processed is switched. Here, assuming that the first processing unit is a smaller processing unit, the storage capacity for storing pixel values of non-filtered pixels can be reduced. On the other hand, assuming that the first processing unit is a larger processing unit, the coding artifacts removing process in which the probability of degrading the image quality of an image signal will be lower can be performed.

For example, when the first processing unit is a picture, until the filtering target pixels for the horizontal edge of the tenth LCU in FIG. 16A are determined, the pixel values of the non-filtered pixels in the fifth LCU are stored in the storage unit. In other words, although the storage capacity increases because at least pixel values of non-filtered pixels in one line of a picture need to be stored in the storage unit, the probability of degrading the image quality of an image signal will be lower.

On the other hand, when the first processing unit is LCU, the filtering target pixels for the horizontal edge between the tenth LCU and the fifth LCU are determined with reference to pixel values of filtered pixels in the fifth LCU. In other words, although the storage capacity of the storage unit can be reduced, the probability of degrading the image quality of an image signal will be higher.

Embodiment 5

Embodiment 5 describes a coding apparatus that can implement the coding artifacts removing method described in one of Embodiments 1 to 4.

Figure 20A:
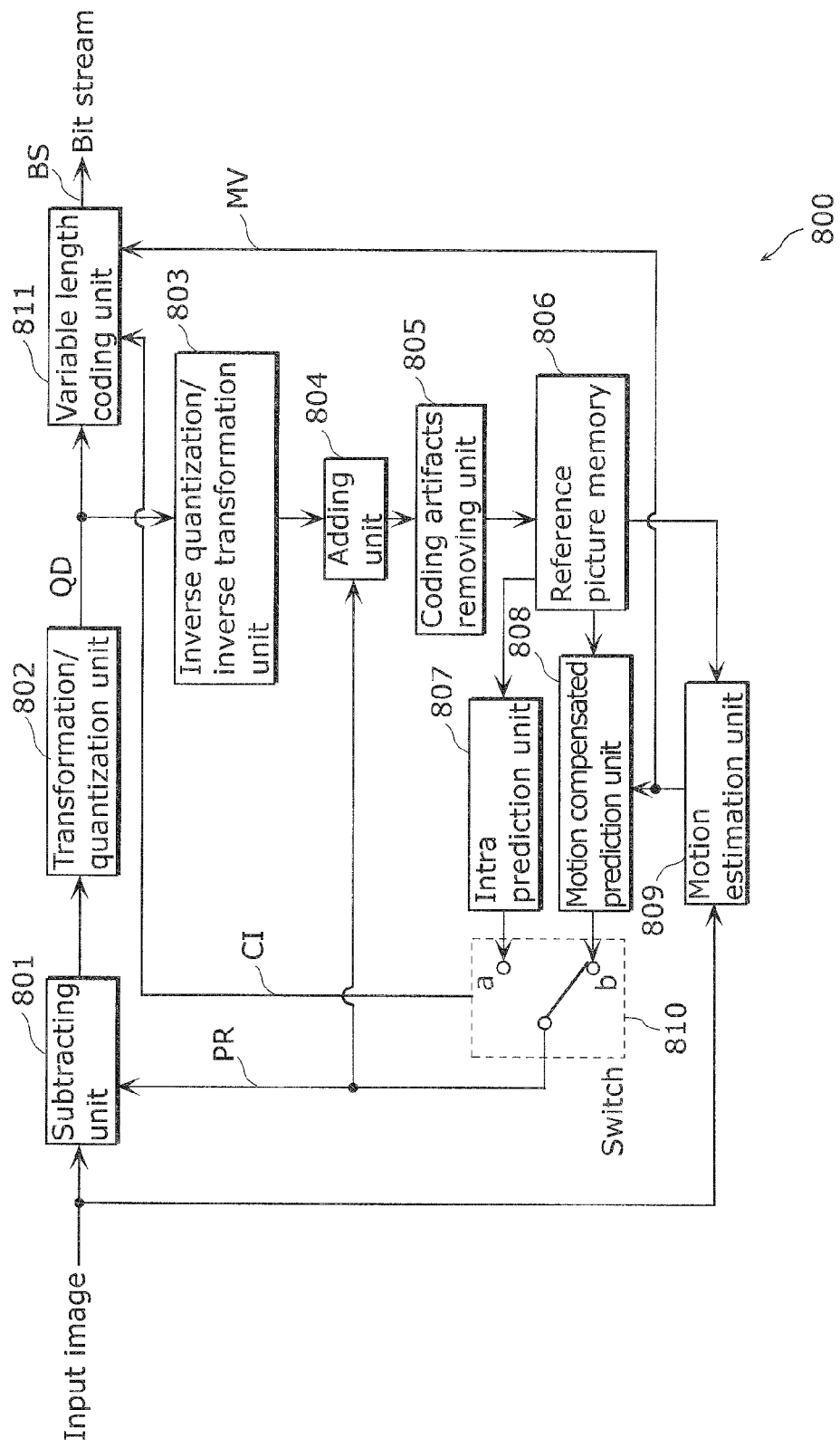
FIG. 20A is a block diagram illustrating a coding apparatus according to Embodiment 5 in the present invention.

FIG. 20A is a block diagram illustrating a coding apparatus 800 according to Embodiment 5. As illustrated in FIG. 20A, the coding apparatus 800 includes a subtracting unit 801, a transformation/quantization unit 802, an inverse quantization/inverse transformation unit 803, an adding unit 804, a coding artifacts removing unit 805, a reference picture memory 806, an intra prediction unit 807, a motion compensated prediction unit 808, a motion estimation unit 809, a switch 810, and a variable length coding unit 811. The reference picture memory 806 may be an external memory connected to the coding apparatus 800.

The transformation/quantization unit 802 is an example of a coding unit. Furthermore, a combination of the inverse quantization/inverse transformation unit 803 and the adding unit 804 is an example of a reconstructing unit.

The coding apparatus 800 receives an input image. Images obtained by decoding coded images are already stored in the reference picture memory 806, and the stored images are used for coding the input image.

The subtracting unit 801 calculates a difference between the input image and a predictive image PR generated by a method to be described later, and outputs the calculated difference image to the transformation/quantization unit 802. The transformation/quantization unit 802 transforms and quantizes the received difference image, and outputs a quantized signal QD to the inverse quantization/inverse transformation unit 803 and the variable length coding unit 811. The inverse quantization/inverse transformation unit 803 inverse-quantizes and inverse-transforms the received quantized signal QD, and outputs the resulting signal to the adding unit 804. The adding unit 804 adds the signal obtained from the inverse quantization/inverse transformation unit 803 to the predictive image PR, and outputs the resulting signal to the coding artifacts removing unit 805.

Here, the coding artifacts removing unit 805 operates as the coding artifacts removing apparatus described in one of Embodiments 1 to 4.

The coding artifacts removing unit 805 removes coding artifacts from the received signal, and outputs, to the reference picture memory 806, the resulting signal as an image obtained by decoding a coded image.

One of the motion compensated prediction and intra prediction is performed when the predictive image PR is generated. The switch 810 switches between the two prediction modes.

Hereinafter, the case where the predictive image PR is generated using the intra prediction will be described. The intra prediction unit 807 obtains a reference picture from the reference picture memory 806, generates an intra-predicted image with reference to the obtained reference picture in a predetermined method (for example, extending adjacent pixels in a horizontal or vertical direction), and outputs the intra-predicted image to "a" of the switch 810. When the switch 810 selects "a", the intra-predicted image is used for coding as a reference image PR.

Hereinafter, the case where the predictive image PR is generated using the motion compensated prediction will be described. The motion estimation unit 809 estimates, from a reference picture, a region corresponding to a block to be coded in the input image, and outputs motion information MV indicating a position of the region, to the motion compensated prediction unit 808 and the variable length coding unit 811. In the estimation method, the motion estimation unit 809 can use a weighted sum of the motion information MV and a difference sum of the input image and an image to be estimated in a reference picture, and others. In such a case, the motion estimation unit 809 has only to output the motion information MV having the smallest value in a predetermined region of the reference picture (for example, in a region of horizontal 32 pixels×vertical 16 pixels).

The motion compensated prediction unit 808 extracts an image included in a reference picture and indicated by the obtained motion information MV, and outputs the extracted image as a motion-compensation predicted image to "b" of the switch 810.

The switch 810 switches between the intra-predicted image and the motion-compensation predicted image to be used for the predictive image PR, using a predetermined method. For example, a difference sum of the input image and the intra-predicted image may be compared with a difference sum of the input image and the motion-compensation predicted image, and a smaller one of the difference sums may be used as the predictive image PR. The switch 810 outputs, to the variable length coding unit 811, information for generating the predictive image PR as predictive image generation information CI.

The variable length coding unit 811 variable length codes the quantized signal QD, the motion information MV, and the predictive image generation information CI, and outputs the resultant as a bit stream BS.

With such a configuration, the image coding apparatus can implement the coding artifacts removing method described in Embodiment 1. Accordingly, a reference image with less coding artifacts can be generated, a difference signal can be smaller, and the code amount can be reduced.

Embodiment 6

Embodiment 6 describes a decoding apparatus that can implement the coding artifacts removing method described in one of Embodiments 1 to 4.

Figure 20B:
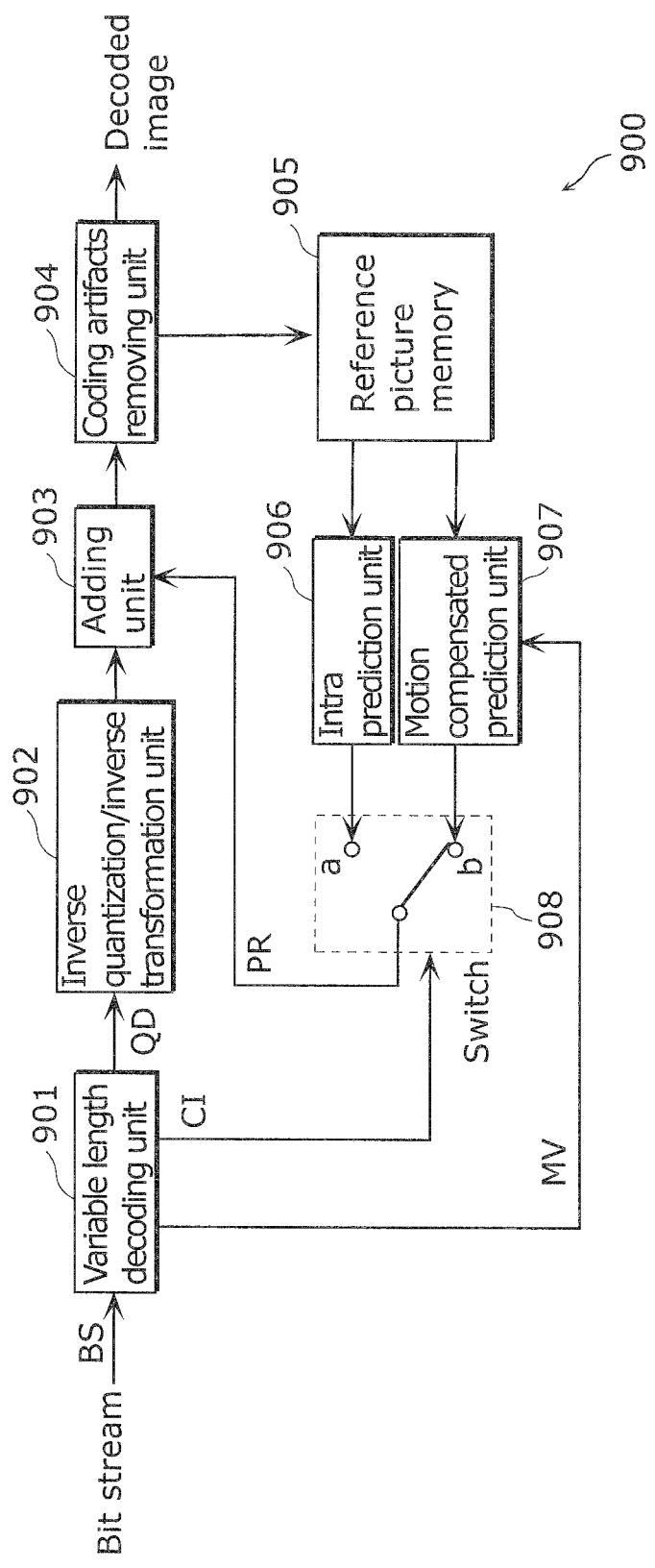
FIG. 20B is a block diagram illustrating a decoding apparatus according to Embodiment 6 in the present invention.

FIG. 20B is a block diagram illustrating a decoding apparatus 900 according to Embodiment 6. As illustrated in FIG. 20B, the decoding apparatus 900 includes a variable length decoding unit 901, an inverse quantization/inverse transformation unit 902, an adding unit 903, a coding artifacts removing unit 904, a reference picture memory 905, an intra prediction unit 906, a motion compensated prediction unit 907, and a switch 908. The reference picture memory 905 may be an external memory connected to the decoding apparatus 900. A combination of the variable length decoding unit 901 and the inverse quantization/inverse transformation unit 902 is an example of a decoding unit.

Here, decoded images are already stored in the reference picture memory 905, and the stored decoded images are used for decoding an input image.

The decoding apparatus 900 receives a bit stream BS. The variable length decoding unit 901 variable length decodes the bit stream BS, obtains the predictive image generation information CI, the motion information MV, and the quantized signal QD, and outputs the predictive image generation information CI, the motion information MV, and the quantized signal QD to the switch 908, the motion compensated prediction unit 907, and the inverse quantization/inverse transformation unit 902, respectively. The inverse quantization/inverse transformation unit 902 inverse-quantizes and inverse-transforms the received quantized signal QD to generate a difference signal, and outputs the difference signal to the adding unit 903. The adding unit 903 adds the difference signal to the predictive image PR to be described later, and outputs the resulting signal to the coding artifacts removing unit 904.

Here, the coding artifacts removing unit 904 operates as the coding artifacts removing apparatus described in one of Embodiments 1 to 4.

The coding artifacts removing unit 904 removes the coding artifacts from the received signal, and outputs, to the reference picture memory 905, the resulting signal as a decoded image.

The intra prediction unit 906 or the motion compensated prediction unit 907 with the motion information MV generates the predictive image PR with reference to a reference picture obtained from the reference picture memory 905, based on the predictive image generation information CI, as the coding apparatus described in Embodiment 2.

With such a configuration, the image decoding apparatus can implement the coding artifacts removing method described in Embodiment 1. Accordingly, the coding apparatus can accurately decode a bit stream in which the coding artifacts removing method is applied.

With the modified configuration of the decoding apparatus in FIG. 20B, the coding artifacts removing method can be applied to a decoded image for a bit stream in which the coding artifacts removing method described in Embodiment 1 is not applied.

The modified configuration is that the adding unit 903 in FIG. 20B outputs an output value not to the coding artifacts removing unit 904 but to the reference picture memory 905. On the other hand, in the configuration, the coding artifacts removing unit 904 does not output any output value to the reference picture memory 905, and outputs only a decoded image and performs the operations as described above.

With such a configuration, since an image processed by the coding artifacts removing unit 904 is not used as a reference picture, the reference image PR can be generated, and a bit stream can be accurately decoded as by the coding apparatus. Furthermore, since the decoding artifacts removing method can be applied to an output image (decoded image), the coding artifacts can be reduced.

Although the coding artifacts removing method according to Embodiments 1 to 6 are described, the coding artifacts removing method according to an aspect of the present invention is not limited by these Embodiments. For example, the coding artifacts removing method according to an aspect of the present invention may be a method including each step as in FIG. 20C.

Figure 20C:
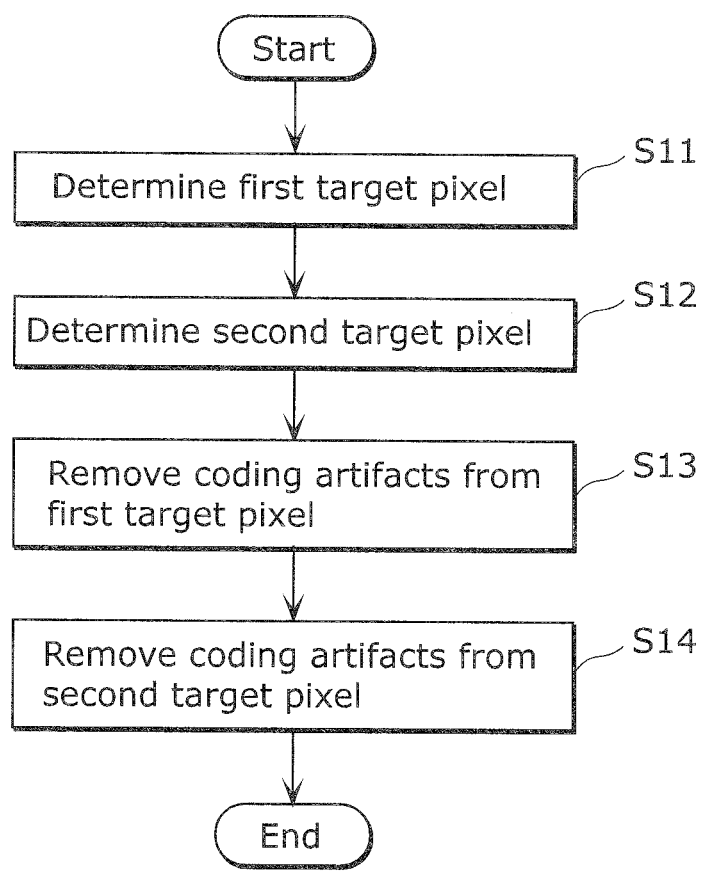
FIG. 20C is a flowchart indicating an example of a coding artifacts removing method according to an aspect of the present invention.

FIG. 20C is a flowchart indicating an example of a coding artifacts removing method according to an aspect of the present invention. In FIG. 20C, the first target pixel from which coding artifacts are to be removed for a first processed edge is determined based on at least pixel values of first adjacent pixels adjacent to the first processed edge (Step S11). Furthermore, the second target pixel from which coding artifacts are to be removed for a second processed edge is determined based on at least pixel values of second adjacent pixels adjacent to the second processed edge (Step S12).

Next, coding artifacts are removed from the determined first target pixel (Step S13). Next, coding artifacts are removed from the determined second target pixel (Step S14).

The present invention may be implemented as a coding artifacts removing apparatus including processing units that perform the processes in Steps included in the coding artifacts removing method in FIG. 20C.

Embodiment 7

The processing described in each of Embodiments can be simply implemented in an independent computer system, by recording, in a recording medium, a program for implementing the configurations of the video coding method and the video decoding method described in each of Embodiments. The recording media may be any recording media as long as the program can be recorded, such as a magnetic disk, an optical disc, a magnetic optical disc, an IC card, and a semiconductor memory.

Hereinafter, the applications to the video coding method and the video decoding method described in each of Embodiments and systems using thereof will be described.

Figure 21:
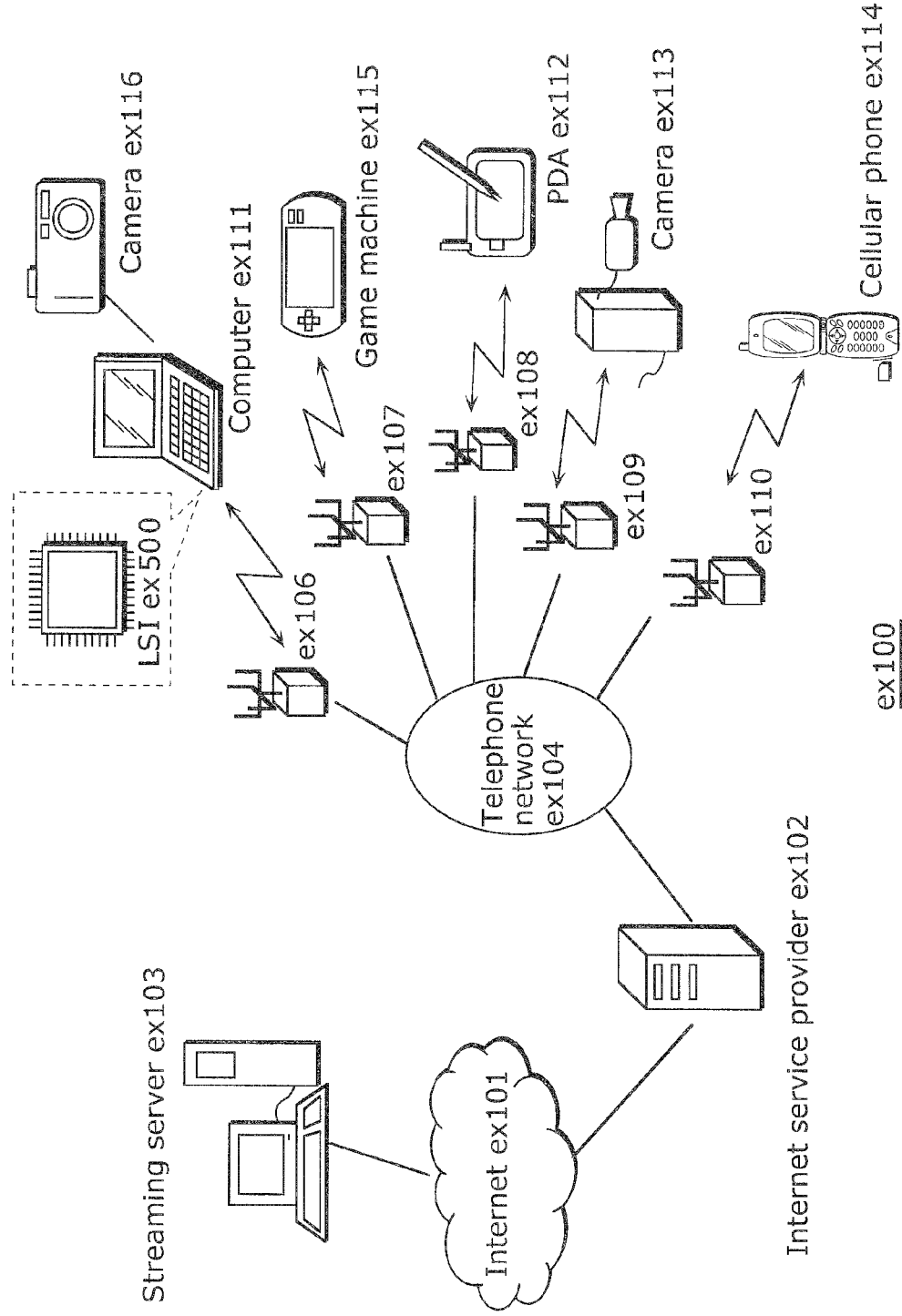
FIG. 21 illustrates an overall configuration of a content providing system ex100 for implementing content distribution services.

FIG. 21 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110.

However, the configuration of the content providing system ex100 is not limited to the configuration shown in FIG. 21, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of Embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 22:
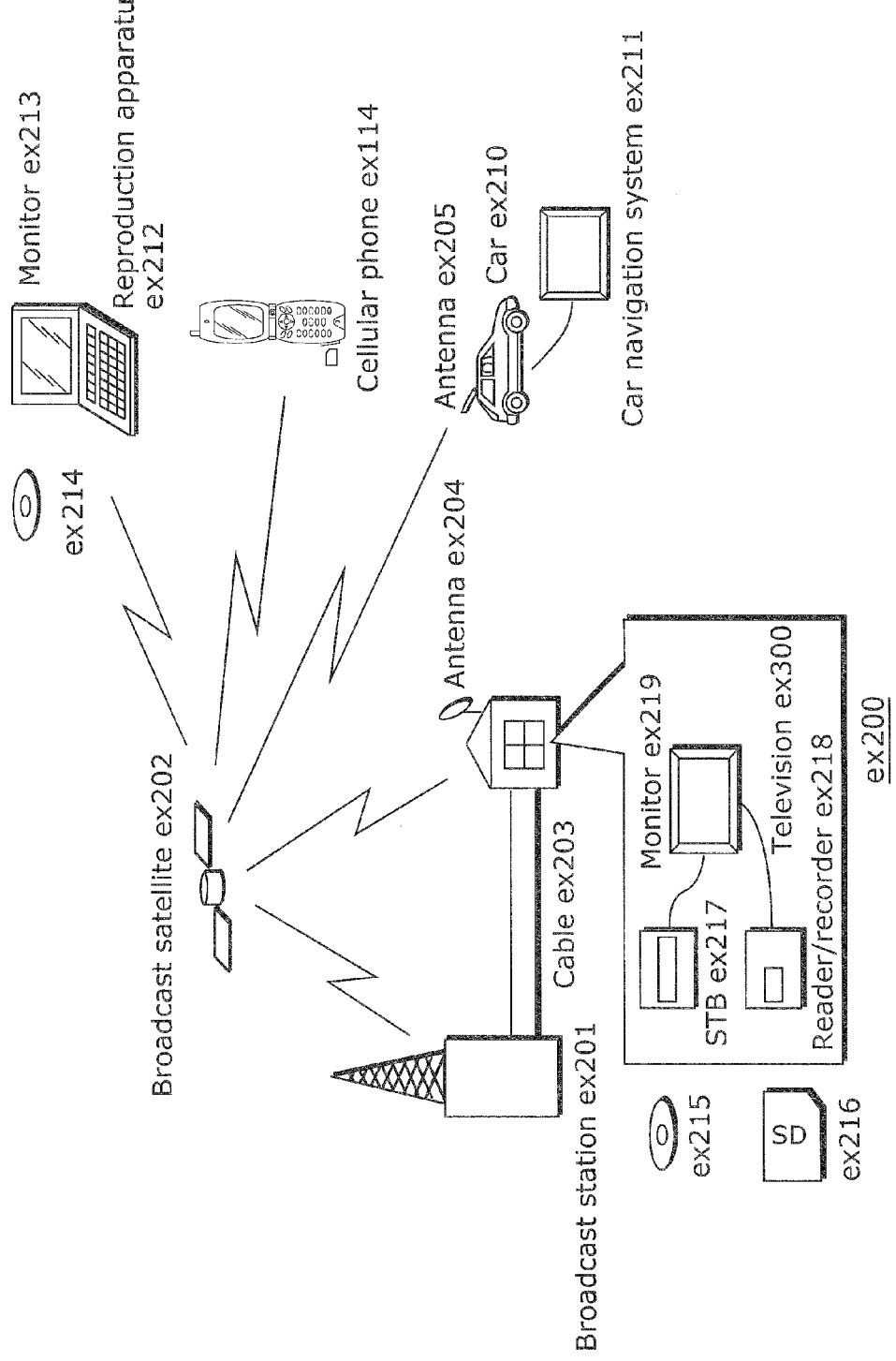
FIG. 22 illustrates an overall configuration of a digital broadcasting system.

Aside from the example of the content providing system ex100, at least one of the video coding apparatus and the video decoding apparatus described in each of Embodiments may be implemented in a digital broadcasting system ex200 illustrated in FIG. 22. More specifically, a broadcast station ex201 communicates or transmits, via radio waves to a broadcast satellite ex202, multiplexed data obtained by multiplexing audio data and others onto video data. The video data is data coded by the video coding method described in each of Embodiments. Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data and reproduces the decoded data.

Furthermore, a reader/recorder ex218 that (i) reads and decodes the multiplexed data recorded on a recording media ex215, such as a DVD and a BD, or (i) codes video signals in the recording medium ex215, and in some cases, writes data obtained by multiplexing an audio signal on the coded data can include the video decoding apparatus or the video coding apparatus as shown in each of Embodiments. In this case, the reproduced video signals are displayed on the monitor ex219, and can be reproduced by another device or system using the recording medium ex215 on which the multiplexed data is recorded. It is also possible to implement the video decoding apparatus in the set top box ex217 connected to the cable ex203 for a cable television or to the antenna ex204 for satellite and/or terrestrial broadcasting, so as to display the video signals on the monitor ex219 of the television ex300. The video decoding apparatus may be implemented not in the set top box but in the television ex300.

Figure 23:
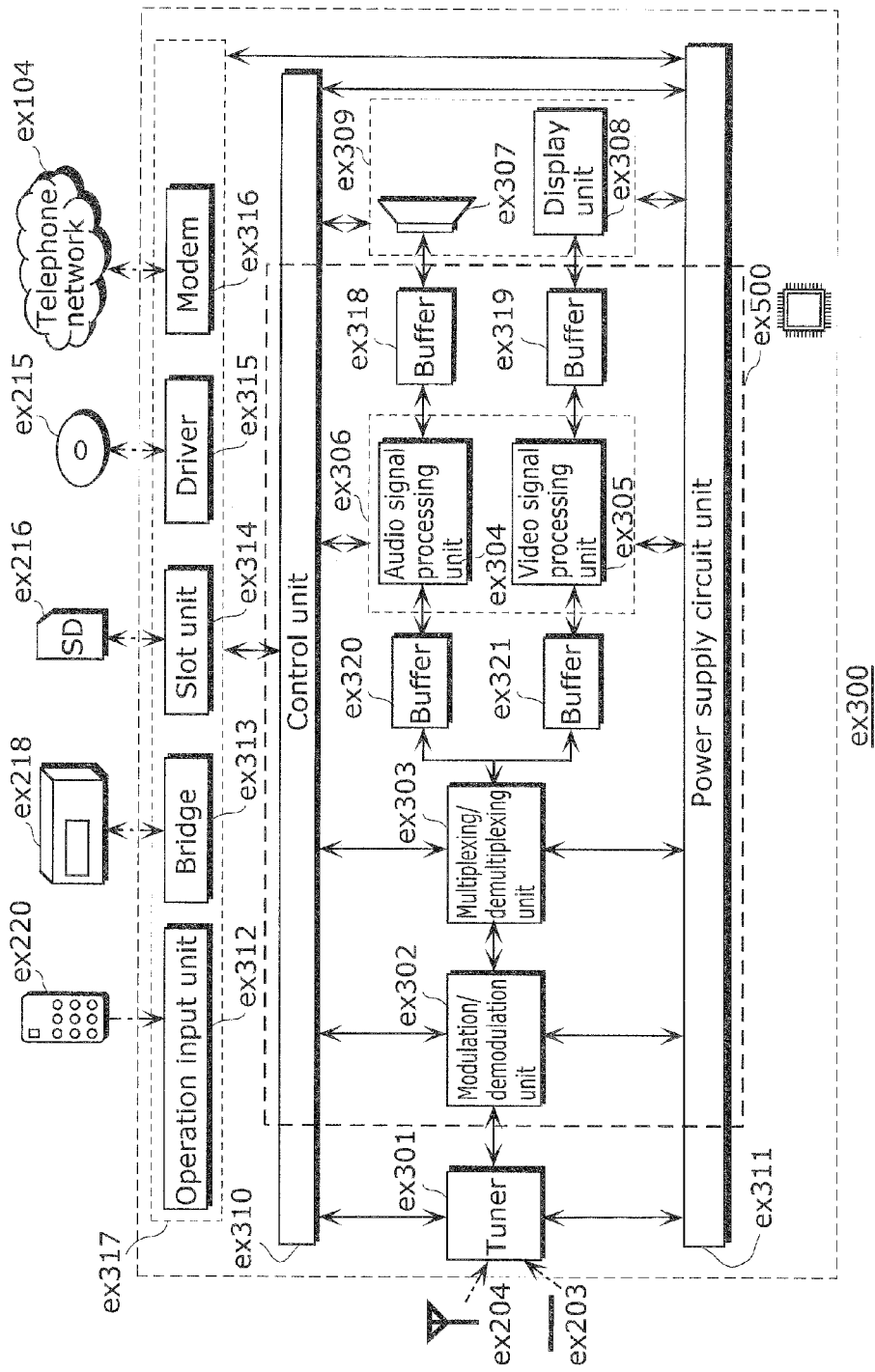
FIG. 23 is a block diagram illustrating a configuration example of a television.

FIG. 23 illustrates the television (receiver) ex300 that uses the video coding method and the video decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation from a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and an SD card. Next, a configuration in which the television ex300 codes an audio signal and a video signal, and transmits the data outside or writes the data on a recording medium will be described. In the television ex300, upon a user operation from the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signals outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 24:
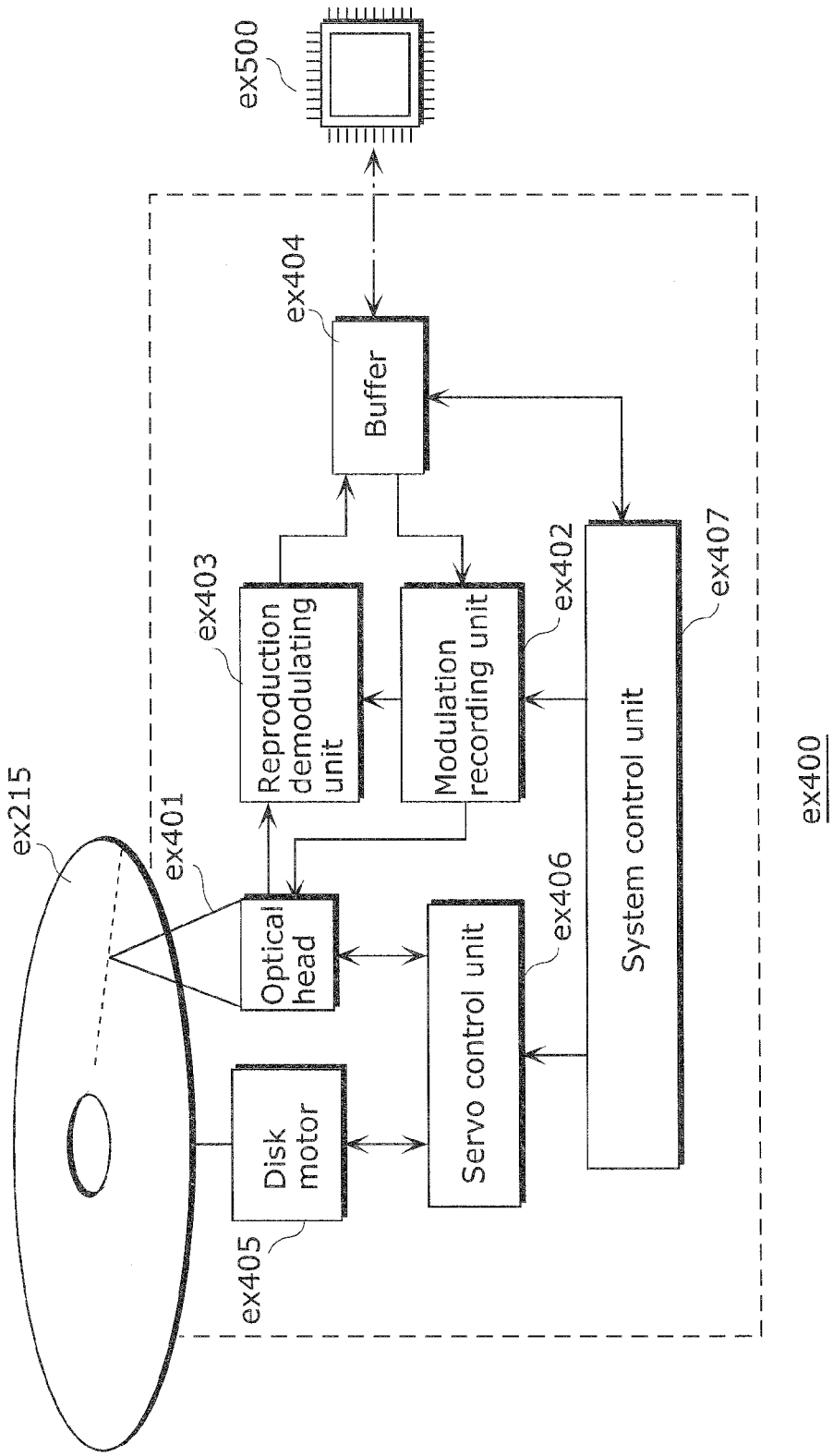
FIG. 24 is a block diagram illustrating an example of a configuration of an information reproducing/recording unit that reads and writes information from or on a recording medium that is an optical disc.

As an example, FIG. 24 illustrates a configuration of an information reproducing/recording unit ex400 when data is read or written from or on an optical disc. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 25:
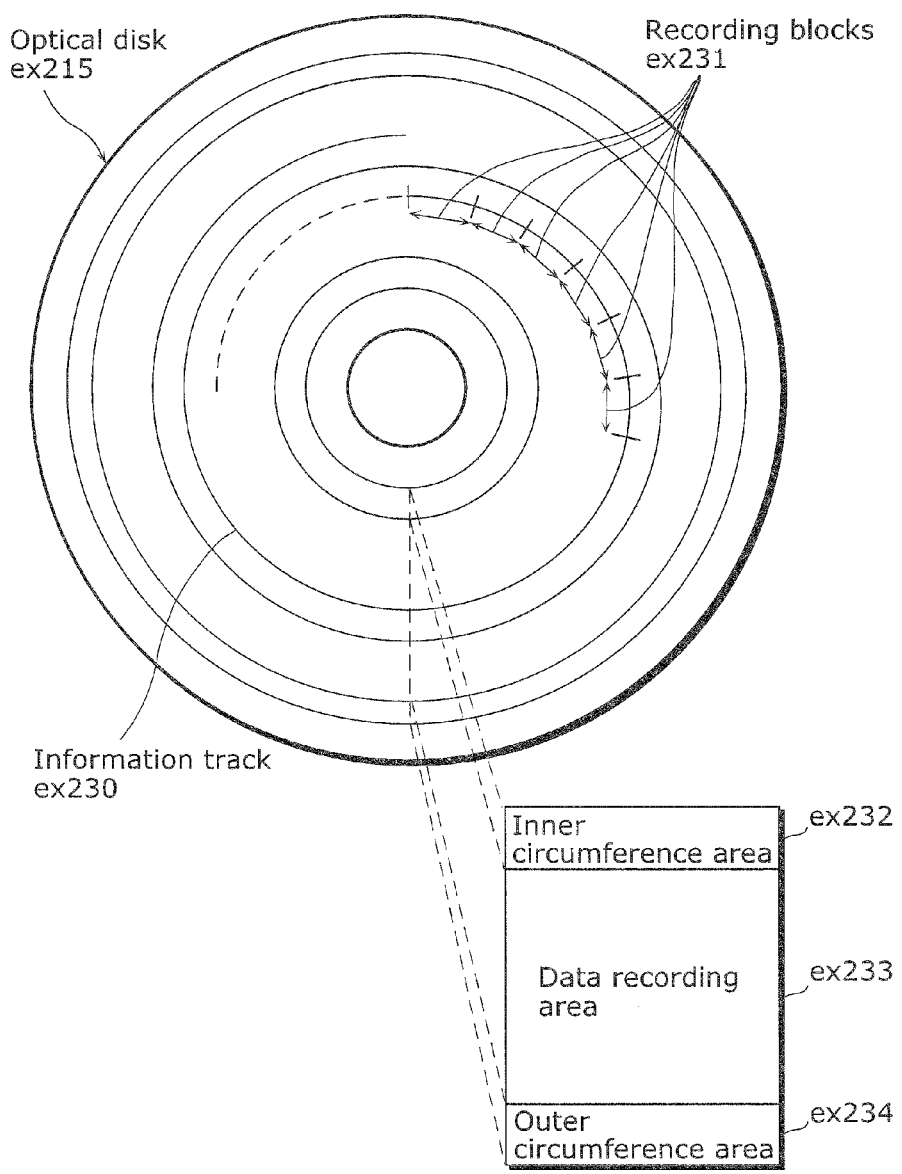
FIG. 25 illustrates an example of a configuration of a recording medium that is an optical disc.

FIG. 25 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to identification of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording of information using light of colors with different wavelengths in the same portion of the optical disc and recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 23. The same will be true for the configuration of the computer ex111, the cellular phone ex114, and others.

FIG. 26 (a) illustrates the cellular phone ex114 that uses the video coding method and the video decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including a set of operation keys ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 26 (b). In the cellular phone ex114, a main control unit ex360 designed to control overall each unit of the main body including the display unit ex358 as well as the operation keys ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. In addition, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex356.

Furthermore, when an e-mail in data communication mode is transmitted, text data of the e-mail inputted by operating the operation keys ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the video coding method shown in each of Embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a video decoding method corresponding to the coding method shown in each of Embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the video coding method and the video decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

Embodiment 8

Video data can be generated by switching, as necessary, between (i) the video coding method or the video coding apparatus shown in each of Embodiments and (ii) a video coding method or a video coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be identified, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the video coding method and by the video coding apparatus shown in each of Embodiments will be hereinafter described. The multiplexed data is a digital stream in the MPEG2-Transport Stream format.

FIG. 27 illustrates a structure of the multiplexed data. As illustrated in FIG. 27, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of a movie. Here, the primary video is normal video to be displayed on a screen, and the secondary video is video to be displayed on a smaller window in the main video. Furthermore, the interactive graphics stream represents an interactive screen to be generated by arranging the GUI components on a screen. The video stream is coded in the video coding method or by the video coding apparatus shown in each of Embodiments, or in a video coding method or by a video coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 28:
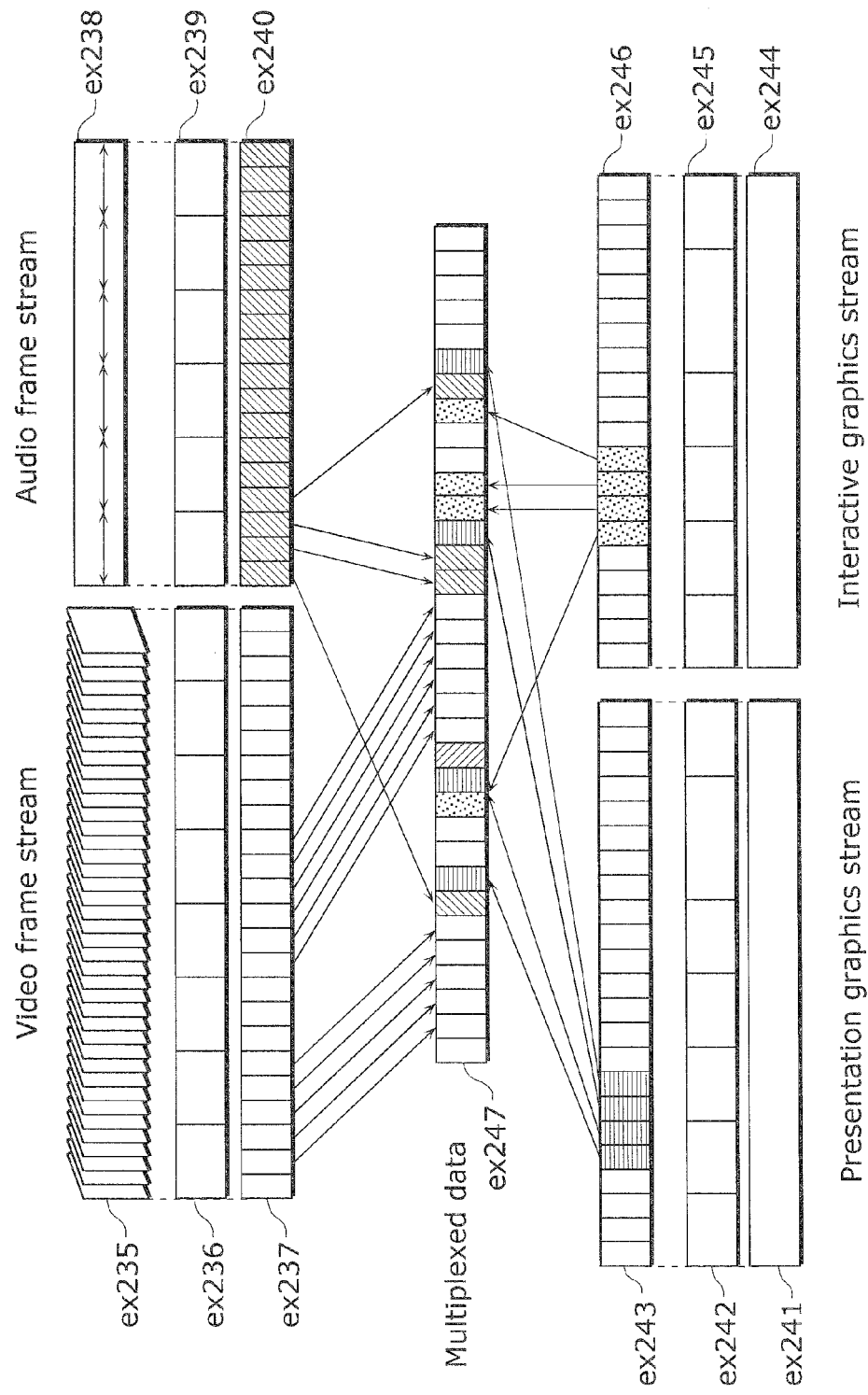
FIG. 28 schematically illustrates how each of streams is multiplexed in multiplexed data.

FIG. 28 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 29:
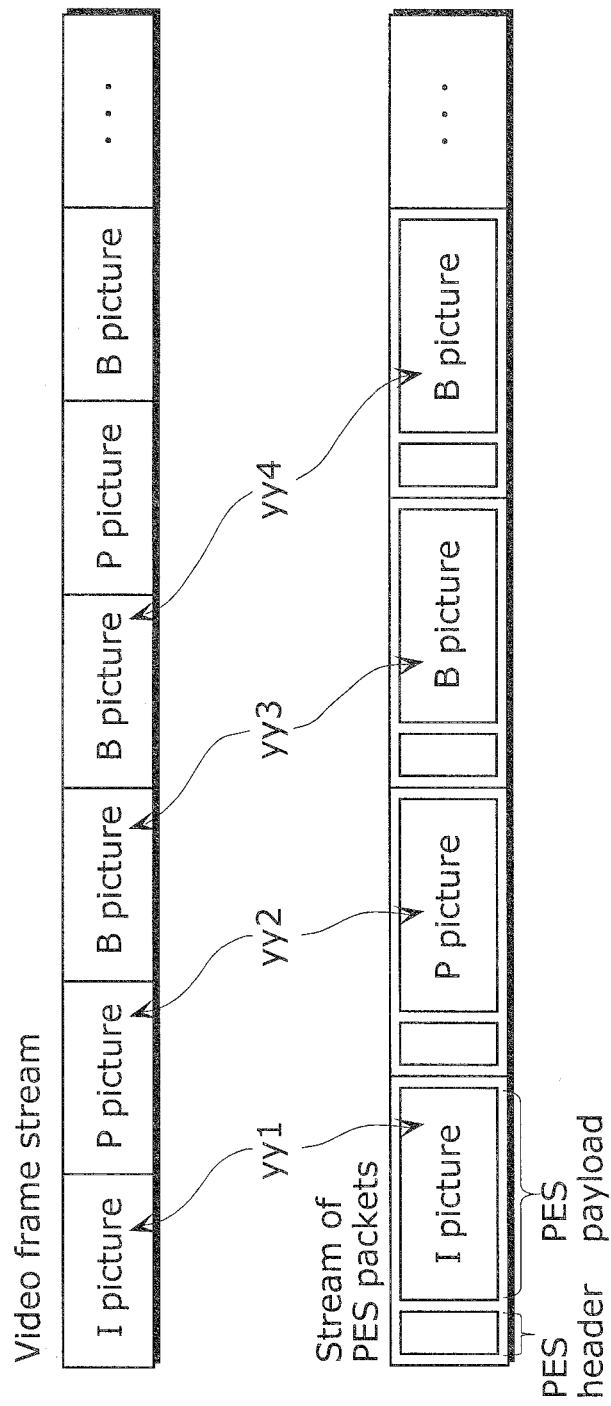
FIG. 29 illustrates how a video stream is stored in a stream of PES packets in more detail.

FIG. 29 illustrates how a video stream is stored in a stream of PES packets in more detail. The first bar in FIG. 29 shows a video frame stream in a video stream. The second bar shows the stream of PES packets. As indicated by arrows denoted as yy2, yy2, yy3, and yy4 in FIG. 29, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 30 illustrates a format of TS packets to be finally written on the multiplexed data. Each of the TS packets is a 188-byte fixed length packet including a 4-byte TS header having information, such as a PID for identifying a stream, and a 184-byte TS payload for storing data. The PES packets are divided, and stored in the TS payloads. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 30. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 31 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 32:
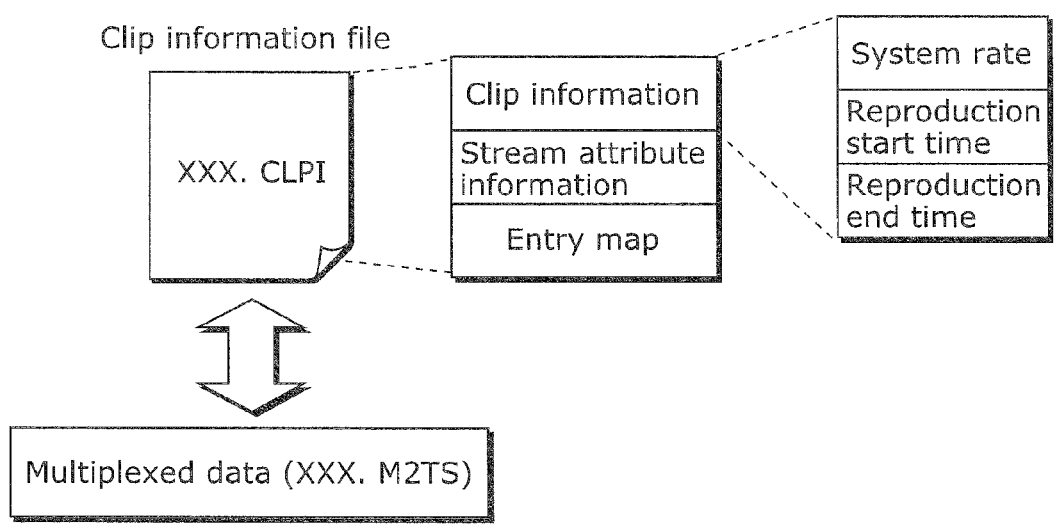
FIG. 32 illustrates an internal structure of multiplexed data information.

Each of the multiplexed data information files is management information of the multiplexed data as shown in FIG. 32. The multiplexed data information files are in one to one correspondence with the multiplexed data, and each of the files includes multiplexed data information, stream attribute information, and an entry map.

As illustrated in FIG. 32, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 33:
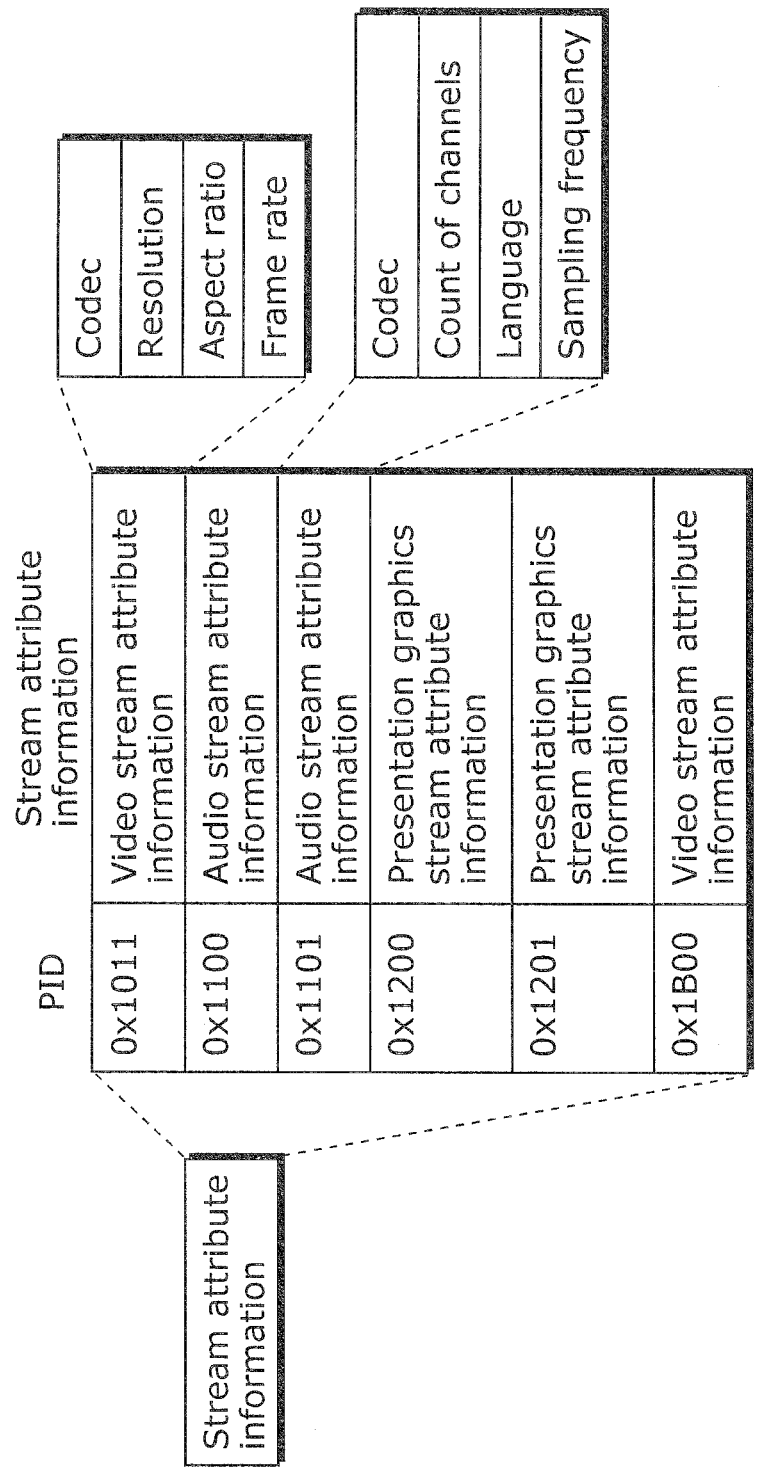
FIG. 33 illustrates an internal structure of stream attribute information.

As shown in FIG. 33, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In Embodiment 8, the multiplexed data to be used is of a stream type included in the PMT. Furthermore, when the multiplexed data is recorded on a recording medium, the video stream attribute information included in the multiplexed data information is used. More specifically, the video coding method or the video coding apparatus described in each of Embodiments includes a step or a unit for allocating unique information indicating video data generated by the video coding method or the video coding apparatus in each of Embodiments, to the stream type included in the PMT or the video stream attribute information. With the configuration, the video data generated by the video coding method or the video coding apparatus described in each of Embodiments can be distinguished from video data that conforms to another standard.

Figure 34:
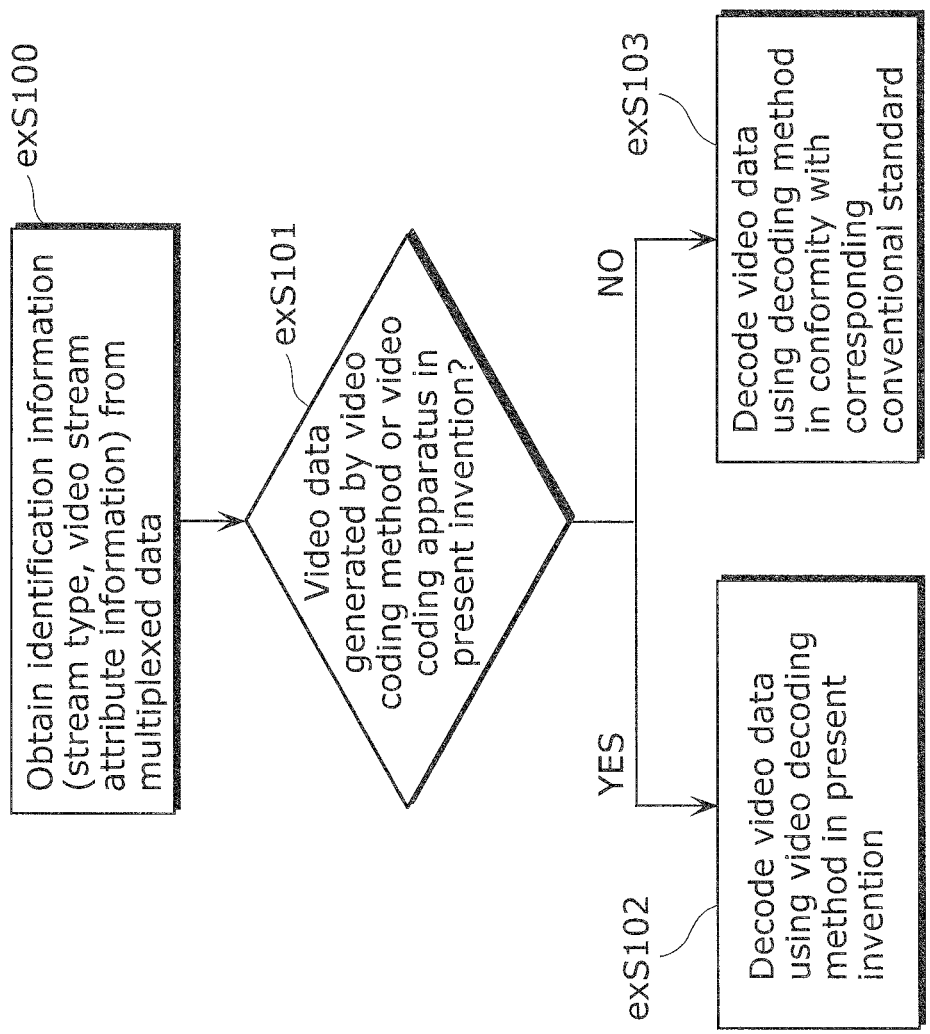
FIG. 34 illustrates steps for identifying video data.

Furthermore, FIG. 34 illustrates steps of the video decoding method according to Embodiment 8. In Step exS100, the stream type included in the PMT or the video stream attribute information is obtained from the multiplexed data. Next, in Step exS101, it is determined whether or not the stream type or the video stream attribute information indicates that the multiplexed data is generated by the video coding method or the video coding apparatus in each of Embodiments. When it is determined that the stream type or the video stream attribute information indicates that the multiplexed data is generated by the video coding method or the video coding apparatus in each of Embodiments, in Step exS102, the stream type or the video stream attribute information is decoded by the video decoding method in each of Embodiments. Furthermore, when the stream type or the video stream attribute information indicates conformance to the conventional standards, such as MPEG-2, MPEG4-AVC, and VC-1, in Step exS103, the stream type or the video stream attribute information is decoded by a video decoding method in conformity with the conventional standards.

As such, allocating a new unique value to the stream type or the video stream attribute information enables determination whether or not the video decoding method or the video decoding apparatus that is described in each of Embodiments can perform decoding. Even when multiplexed data that conforms to a different standard, an appropriate decoding method or apparatus can be selected. Thus, it becomes possible to decode information without any error. Furthermore, the video coding method or apparatus, or the video decoding method or apparatus in Embodiment 8 can be used in the devices and systems described above.

Embodiment 9

Figure 35:
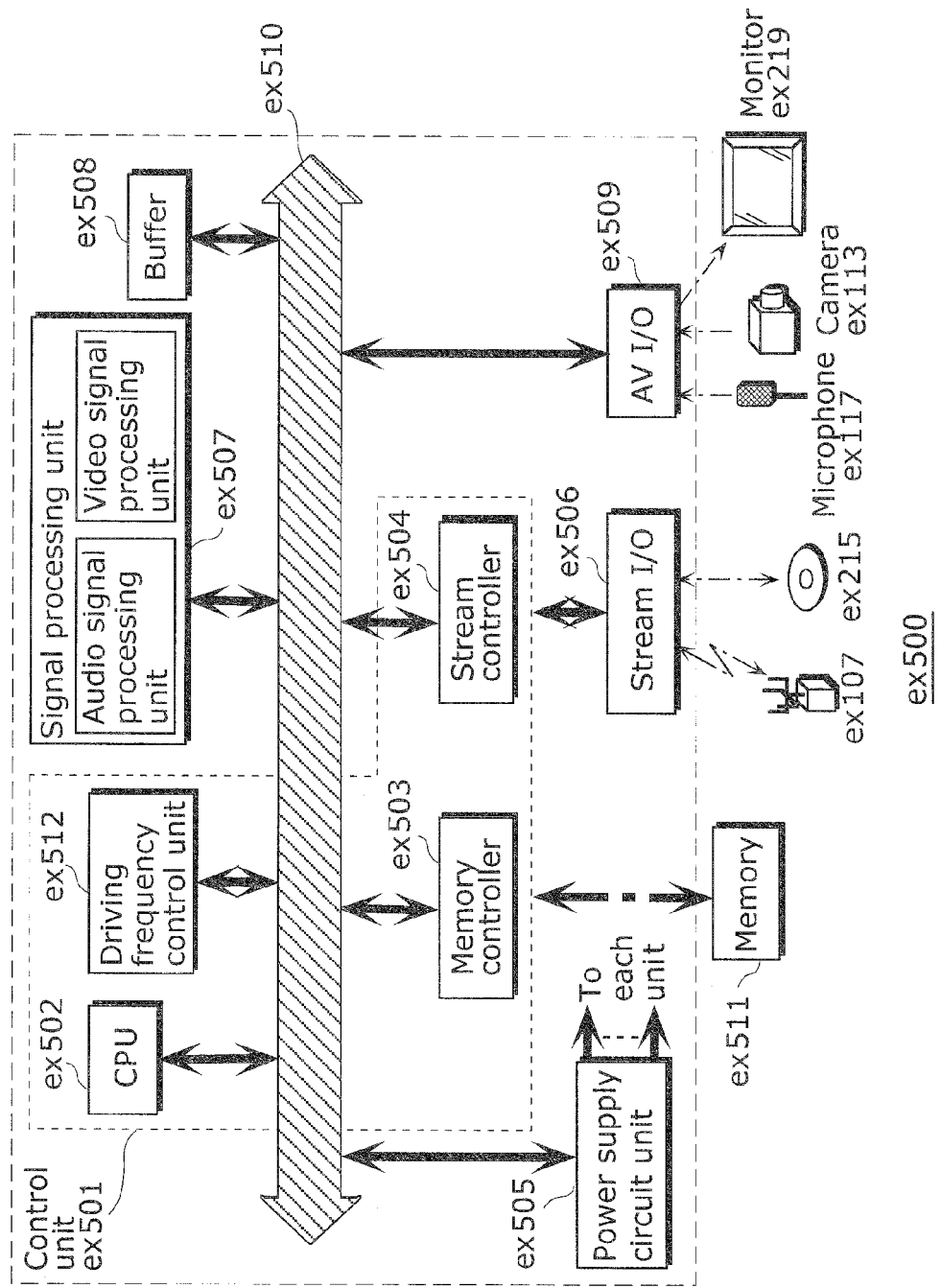
FIG. 35 is a block diagram illustrating an example of a configuration of an integrated circuit for implementing the video coding method and the video decoding method according to each of Embodiments.

Each of the video coding method, the video coding apparatus, the video decoding method, and the video decoding apparatus in each of Embodiments is typically achieved in the form of an integrated circuit or a Large Scale Integrated (LSI) circuit. As an example of the LSI, FIG. 35 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to a base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 10

When video data is decoded in the video coding method or by the video coding apparatus described in each of Embodiments, compared to when video data that conforms to a conventional standard, such as MPEG-2, MPEG4-AVC, and VC-1, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 36:
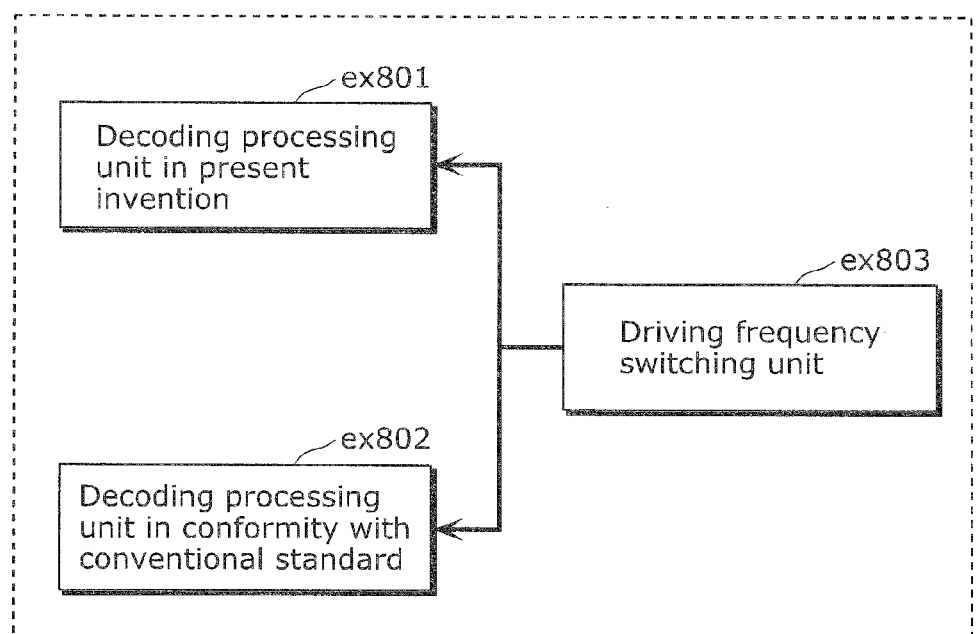
FIG. 36 illustrates a configuration for switching between driving frequencies.

In order to solve the problem, the video decoding apparatus, such as the television ex300 and the LSI ex500 is configured to determine to which standard the video data conforms, and switch between the driving frequencies according to the determined standard. FIG. 36 illustrates a configuration ex800 in Embodiment 10. A driving frequency switching unit ex803 sets a driving frequency to a higher driving frequency when video data is generated by the video coding method or the video coding apparatus described in each of Embodiments. Then, the driving frequency switching unit ex803 instructs a decoding processing unit ex801 that executes the video decoding method described in each of Embodiments to decode the video data. When the video data conforms to the conventional standard, the driving frequency switching unit ex803 sets a driving frequency to a lower driving frequency than that of the video data generated by the video coding method or the video coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 35. Here, each of the decoding processing unit ex801 that executes the video decoding method described in each of Embodiments and the decoding processing unit ex802 that conforms to the conventional standard corresponds to the signal processing unit ex507 in FIG. 35. The CPU ex502 determines to which standard the video data conforms. Then, the driving frequency control unit ex512 determines a driving frequency based on a signal from the CPU ex502. Furthermore, the signal processing unit ex507 decodes the video data based on a signal from the CPU ex502. For example, the identification information described in Embodiment 8 is probably used for identifying the video data. The identification information is not limited to the one described in Embodiment 8 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 38. The driving frequency can be selected by storing the look-up table in the buffer ex508 and an internal memory of an LSI and with reference to the look-up table by the CPU ex502.

Figure 37:
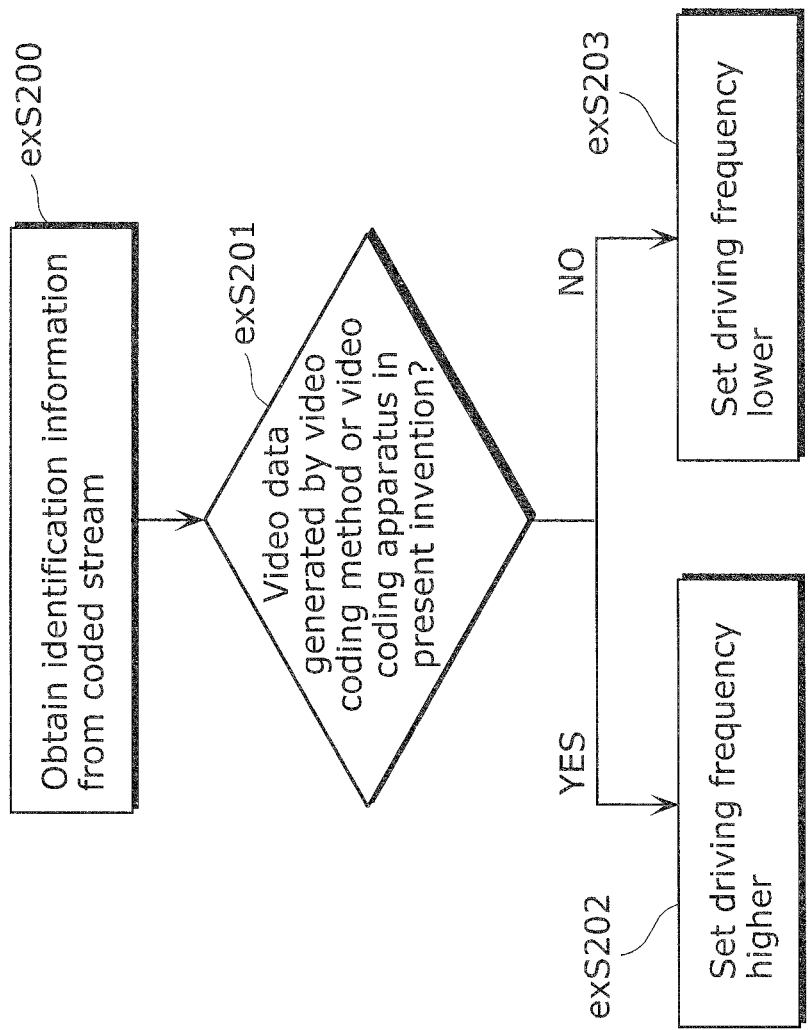
FIG. 37 illustrates steps for identifying video data and switching between driving frequencies.
Figure 40:
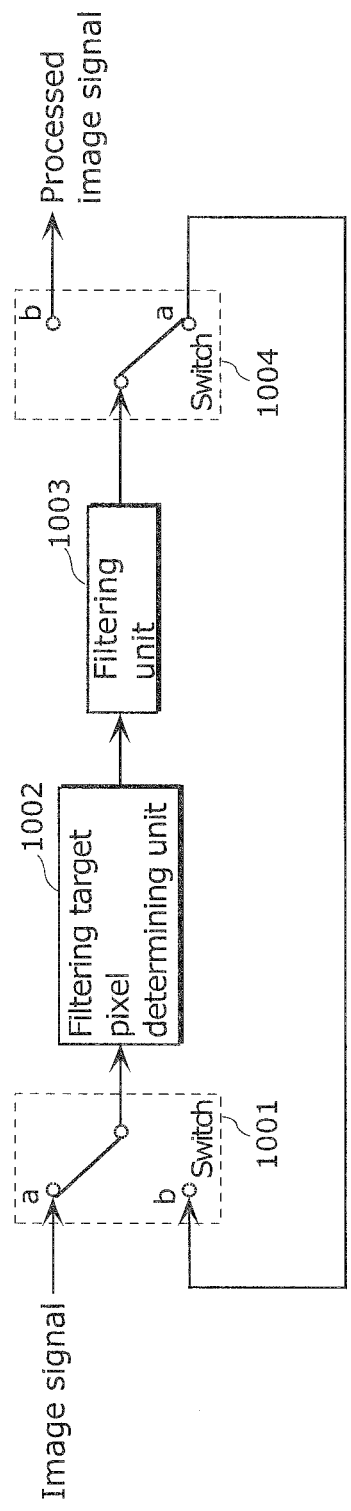
FIG. 40 illustrates a block diagram of a coding artifacts removing unit in each of a conventional image coding apparatus and a conventional image decoding apparatus.
Figure 41:
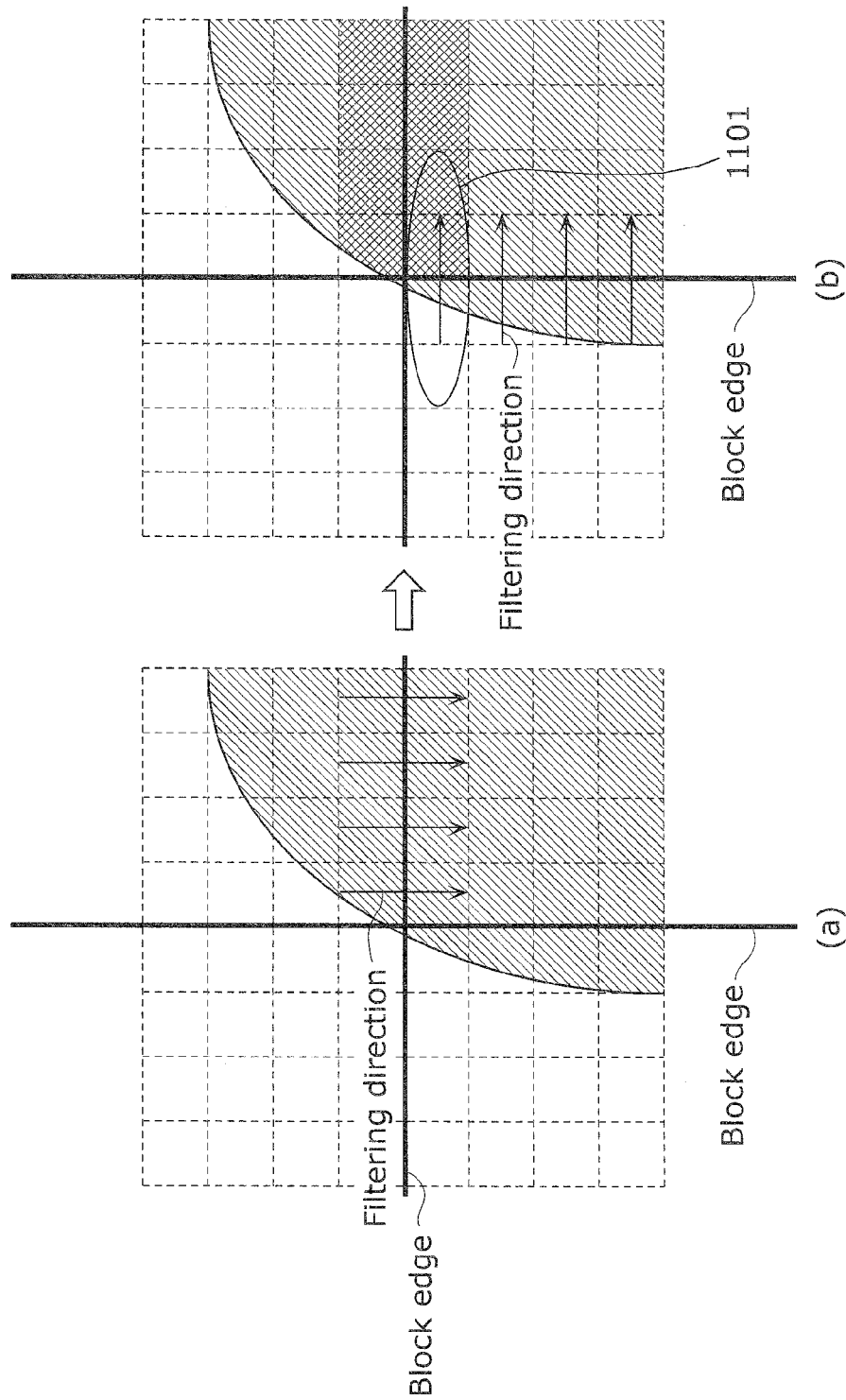
FIG. 41 schematically illustrates a problem in a conventional coding artifacts removing method.

FIG. 37 illustrates steps for executing a method in Embodiment 10. First, in Step exS200, the signal processing unit ex507 obtains identification information from the multiplexed data. Next, in Step exS201, the CPU ex502 determines whether or not the video data is generated based on the identification information by the coding method and the coding apparatus described in each of Embodiments. When the video data is generated by the coding method and the coding apparatus described in each of Embodiments, in Step exS202, the CPU ex502 transmits a signal for setting the driving frequency to a higher driving frequency, to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency, to the driving frequency control unit ex512. Then, the driving frequency control unit ex512 sets the driving frequency to the lower driving frequency than that in the case where the video data is generated by the coding method and the coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG4-AVC is larger than the processing amount for decoding video data generated by the video coding method and the video coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the video coding method and the video coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the video coding method and the video coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the video coding method and the video coding apparatus described in each of Embodiments, in the case where the CPU ex502 may have a time delay, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 11

There are cases where a plurality of video data that conforms to a different standard, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the video decoding method described in each of Embodiments and the decoding processing unit that conforms to the conventional standard, such as MPEG-2, MPEG4-AVC, and VC-1 are partly shared. Ex900 in FIG. 39A shows an example of the configuration. For example, the video decoding method described in each of Embodiments and the video decoding method that conforms to MPEG4-AVC have, partly in common, the details of processing, such as entropy coding, inverse quantization, deblocking filtering, and motion compensated prediction. The details of processing to be shared probably includes use of a decoding processing unit ex902 that conforms to MPEG4-AVC. In contrast, a dedicated decoding processing unit ex901 is probably used for other processing that is unique to the present invention and does not conform to MPEG4-AVC. The decoding processing unit for implementing the video decoding method described in each of Embodiments may be shared for the processing to be shared, and a dedicated decoding processing unit may be used for processing unique to that of MPEG4-AVC.

Furthermore, ex1000 in FIG. 39B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the video decoding method in the present invention and the conventional video decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of Embodiment 11 can be implemented by the LSI ex500.

As such, reducing the scale of the circuit of an LSI and reducing the cost are possible by sharing the decoding processing unit for the processing to be shared between the video decoding method in the present invention and the video decoding method in conformity with the conventional standard.

INDUSTRIAL APPLICABILITY

The coding method and the decoding method using the coding artifacts removing method according to an aspect of the present invention can remove coding artifacts while maintaining an object edge that is sometimes lost in the conventional coding artifacts removing method. Accordingly, the methods have the advantages of improving the image quality of a decoded image, and are applicable to various situations, such as storing, transmitting, and communicating information. For example, the present invention is applicable to information display apparatuses and image capturing apparatuses with high resolution, such as a television, a digital television recorder, a car navigation system, a mobile phone, a digital camera, and a digital video camera, and is highly suitable for practical use.

REFERENCE SIGNS LIST

100, 600, 700 Coding artifacts removing apparatus
102, 701, 1002 Filtering target pixel determining unit
103, 603 Filtering candidate information holding unit
101, 104, 105, 107, 604, 606, 810, 908, 1001, 1004 Switch 106, 605, 703, 1003 Filtering unit
601 First filtering target pixel determining unit
602 Second filtering target pixel determining unit
800 Coding apparatus
801 Subtracting unit
802 Transformation/quantization unit
803, 902 Inverse quantization/inverse transformation unit
804, 903 Adding unit
805, 904 Coding artifacts removing unit
806, 905 Reference picture memory
807, 906 Intra prediction unit
808, 907 Motion compensated prediction unit
809 Motion estimation unit
811 Variable length coding unit
900 Decoding apparatus
901 Variable length decoding unit

The invention claimed is:

1. A method of decoding an image from a bit stream, said method comprising:
    decoding an image signal from the bit stream; and
    removing coding artifacts from pixels of a processed edge in the image signal decoded in said decoding,
    wherein said removing comprises:
        determining, based on at least pixel values of adjacent pixels, a target pixel from which coding artifacts are to be removed for the processed edge, the adjacent pixels being adjacent to the processed edge; and
        removing the coding artifacts from the determined target pixel,
        wherein said determining and said removing are performed for each processing unit including at least one of pixels included in the image signal decoded in said decoding,
        pixel values of pixels which are included in a processed processing unit and from which the coding artifacts are not removed are stored in a storage unit,
        the pixels which are included in the processed processing unit include at least one of the adjacent pixels, and
        in said determining, at least one of the pixel values of the adjacent pixels which are included in the processed processing unit is read from the storage unit, and the target pixel is determined based on the at least one read pixel value.

2. A method of coding an image, said method comprising:
    coding the image;
    reconstructing an image signal from the image coded in said coding; and
    removing coding artifacts from pixels of a processed edge in the image signal reconstructed in said reconstructing,
    wherein in said coding, the image is coded with reference to the image signal from which the coding artifacts are removed in said removing, and
    wherein said removing comprises:
        determining, based on at least pixel values of adjacent pixels, a target pixel from which coding artifacts are to be removed for the processed edge, the adjacent pixels being adjacent to the processed edge; and
        removing the coding artifacts from the determined target pixel,
        wherein said determining and said removing are performed for each processing unit including at least one of pixels included in the image signal reconstructed in said reconstructing,
        pixel values of pixels which are included in a processed processing unit and from which the coding artifacts are not removed are stored in a storage unit,
        the pixels which are included in the processed processing unit include at least one of the adjacent pixels, and
        in said determining, at least one of the pixel values of the adjacent pixels which are included in the processed processing unit is read from the storage unit, and the target pixel is determined based on the at least one read pixel value.

3. A decoding apparatus that decodes an image from a bit stream, said apparatus comprising:
    a decoding unit configured to decode an image signal from the bit stream; and
    a coding artifacts removing apparatus configured to remove coding artifacts from pixels of a processed edge in the image signal decoded by said decoding unit,
    wherein said coding artifacts removing apparatus includes:
        a processor; and
        a non-transitory memory having stored thereon executable instructions, which when executed by the processor, cause said coding artifacts removing apparatus to function as:
            a determining unit configured to determine, based on at least pixel values of adjacent pixels, a target pixel from which coding artifacts are to be removed for the processed edge, the adjacent pixels being adjacent to the processed edge; and
            a removing unit configured to remove the coding artifacts from the determined target pixel,
        wherein said determining unit and said removing unit are configured to perform the determining and the removing, for each processing unit including at least one of pixels included in the image signal decoded by said decoding unit,
        pixel values of pixels which are included in a processed processing unit and from which the coding artifacts are not removed are stored in a storage unit,
        the pixels which are included in the processed processing unit include at least one of the adjacent pixels, and
        said determining unit is configured to read, from the storage unit, at least one of the pixel values of the adjacent pixels which are included in the processed processing unit, and determine the target pixel based on the at least one read pixel value.

4. A coding apparatus that codes an image, said apparatus comprising:
    a coding unit configured to code the image;
    a reconstructing unit configured to reconstruct an image signal from the image coded by said coding unit; and
    a coding artifacts removing apparatus configured to remove coding artifacts from pixels of a processed edge in the image signal reconstructed by said reconstructing unit,
    wherein said coding unit is configured to code the image with reference to the image signal from which said coding artifacts removing apparatus removes the coding artifacts, and
    wherein said coding artifacts removing apparatus includes:
        a processor; and
        a non-transitory memory having stored thereon executable instructions, which when executed by the processor, cause said coding artifacts removing apparatus to function as:
            a determining unit configured to determine, based on at least pixel values of adjacent pixels, a target pixel from which coding artifacts are to be removed for the processed edge, the adjacent pixels being adjacent to the processed edge; and a removing unit configured to remove the coding artifacts from the determined target pixel, wherein said determining unit and said removing unit are configured to perform the determining and the removing, for each processing unit including at least one of pixels included in the image signal reconstructed by said reconstructing unit, pixel values of pixels which are included in a processed processing unit and from which the coding artifacts are not removed are stored in a storage unit, the pixels which are included in the processed processing unit include at least one of the adjacent pixels, and said determining unit is configured to read, from the storage unit, at least one of the pixel values of the adjacent pixels which are included in the processed processing unit, and determine the target pixel based on the at least one read pixel value.

* * * * *